United States Patent
Sugimoto et al.

(10) Patent No.: US 11,990,259 B2
(45) Date of Patent: May 21, 2024

(54) RARE EARTH-IRON-NITROGEN-BASED MAGNETIC POWDER, COMPOUND FOR BONDED MAGNET, BONDED MAGNET, AND METHOD FOR PRODUCING RARE EARTH-IRON-NITROGEN-BASED MAGNETIC POWDER

(71) Applicants: Tohoku University, Sendai (JP); SUMITOMO METAL MINING CO., LTD., Tokyo (JP)

(72) Inventors: Satoshi Sugimoto, Sendai (JP); Masashi Matsuura, Sendai (JP); Takashi Ishikawa, Iwanai-gun (JP); Yukinobu Yoneyama, Iwanai-gun (JP)

(73) Assignees: TOHOKU UNIVERSITY, Sendai (JP); SUMITOMO METAL MINING CO., LTD., Tokyo (JP)

( * ) Notice: Subject to any disclaimer, the term of this patent is extended or adjusted under 35 U.S.C. 154(b) by 15 days.

(21) Appl. No.: 18/013,072

(22) PCT Filed: Mar. 31, 2021

(86) PCT No.: PCT/JP2021/013896
§ 371 (c)(1),
(2) Date: Dec. 27, 2022

(87) PCT Pub. No.: WO2022/004081
PCT Pub. Date: Jan. 6, 2022

(65) Prior Publication Data
US 2023/0245807 A1    Aug. 3, 2023

(30) Foreign Application Priority Data
Jun. 29, 2020   (JP) .................................. 2020-111144

(51) Int. Cl.
*H01F 1/053* (2006.01)
*B22F 1/05* (2022.01)
(Continued)

(52) U.S. Cl.
CPC .............. *H01F 1/0551* (2013.01); *B22F 1/05* (2022.01); *B22F 1/10* (2022.01); *C08K 9/02* (2013.01);
(Continued)

(58) Field of Classification Search
CPC ...... H01F 1/053; H01F 1/0551; H01F 1/0552; H01F 1/059; H01F 1/0593; H01F 1/0596
See application file for complete search history.

(56) References Cited

U.S. PATENT DOCUMENTS

2020/0105446 A1    4/2020   Hashimoto et al.

FOREIGN PATENT DOCUMENTS

| JP | H08-055712 A | 2/1996 |
|----|--------------|--------|
| JP | 2003-168602 A | 6/2003 |

(Continued)

OTHER PUBLICATIONS

Takashi Ishikawa et al., "Sm—(Fe,Mn)—N Magnet Powder Made by Reduction and Diffusion Method", IEEJ Transactions on Fundamentals and Materials, vol. 124, No. 10, 2004, pp. 881-886 and English abstract thereof. (discussed in the spec).

(Continued)

*Primary Examiner* — Matthew E. Hoban
(74) *Attorney, Agent, or Firm* — Locke Lord LLP

(57) ABSTRACT

A rare earth-iron-nitrogen-based magnetic powder according to this invention contains, as main constituent components, a rare-earth element (R), iron (Fe), and nitrogen (N). Moreover, this magnetic powder has an average particle size of 1.0-10.0 μm, and contains 22.0-30.0 mass % of a rare-earth element (R) and 2.5-4.0 mass % of nitrogen (N).

(Continued)

Further, this magnetic powder includes: a core part having any one crystal structure among a $Th_2Zn_{17}$ type, a $Th_2Ni_{17}$ type, and a $TbCu_7$ type; and a shell layer provided on the surface of the core part and having a thickness of 1-30 nm. The shell layer contains a rare-earth element (R) and iron (Fe) so that the R/Fe atomic ratio is 0.3-5.0, and further contains 0-10 at % (exclusive of 0) of nitrogen (N). Furthermore, this magnetic powder contains compound particles composed of a rare-earth element (R) and phosphorus (P).

20 Claims, 6 Drawing Sheets

(51) Int. Cl.
| | | |
|---|---|---|
| | *B22F 1/10* | (2022.01) |
| | *C08K 9/02* | (2006.01) |
| | *C22C 38/00* | (2006.01) |
| | *H01F 1/055* | (2006.01) |
| | *H01F 1/059* | (2006.01) |

(52) U.S. Cl.
CPC .......... *C22C 38/001* (2013.01); *C22C 38/005* (2013.01); *B22F 2301/355* (2013.01); *B22F 2304/10* (2013.01); *C08K 2201/005* (2013.01); *C08K 2201/01* (2013.01)

(56) References Cited

FOREIGN PATENT DOCUMENTS

| | | |
|---|---|---|
| JP | 2004-111515 A | 4/2004 |
| JP | 2005-272986 A | 10/2005 |
| JP | 2006-269637 A | 10/2006 |
| JP | 2007-270303 A | 10/2007 |
| JP | 5071160 B2 | 11/2012 |
| JP | 2018-090892 A | 6/2018 |
| JP | 2018-120942 A | 8/2018 |
| JP | 2018-127716 A | 8/2018 |
| JP | 2020-057779 A | 4/2020 |
| WO | 2018/096733 A1 | 5/2018 |

OTHER PUBLICATIONS

Satoshi Sugimoto et al., "The Enhancement of Decomposition Temperature of Sm2Fe17Nx Compound by Additional Elements," Proc. 12th Int. Workshop on RE Magnets and their Applications, Canberra, 1992, pp. 218-227. (discussed In the spec).

Extended European Search Report dated Nov. 20, 2023, issued in the EP Patent Application No. 21832647.8.

RARE EARTH-IRON-NITROGEN-BASED MAGNETIC POWDER, COMPOUND FOR BONDED MAGNET, BONDED MAGNET, AND METHOD FOR PRODUCING RARE EARTH-IRON-NITROGEN-BASED MAGNETIC POWDER

TECHNICAL FIELD

The present invention relates to a rare earth-iron-nitrogen-based magnetic powder, a compound for forming bonded magnets, a bonded magnet, and a method for producing a rare earth-iron-nitrogen-based magnetic powder.

BACKGROUND ART

Many of the rare earth-iron-nitrogen-based compounds represented by $R_2Fe_{17}N_x$ (R is a rare earth element) having a $Th_2Zn_{17}$-, $Th_2Ni_{17}$-, or $TbCu_7$-type crystal structure are known as high-performance magnetic materials having a nucleation-type coercivity generating mechanism. In particular, a magnetic powder including $Sm_2Fe_{17}N_3$ (the rare earth element R is samarium (Sm) and x is 3 in $R_2Fe_{17}N_x$) as a main-phase compound is used to form high-performance permanent magnets. Such a magnetic powder is also used to form a bonded magnet for use in a wide variety of applications. A bonded magnet includes such a magnetic powder and a binder of a thermoplastic resin, such as polyamide 12 or ethylene-ethyl-acrylate, or a thermosetting resin, such as epoxy resin or unsaturated polyester resin.

Conventionally known methods for producing a rare earth-iron-nitrogen-based magnetic powder, such as a $Sm_2Fe_{17}N_3$ magnetic powder, include a melting method and a reduction-diffusion method. The melting method includes melting a raw material including a rare earth metal together with a metal such as iron to react with each other to form magnetic particles. The reduction-diffusion method includes allowing a raw material including a rare earth oxide to undergo reduction and reaction with a metal such as iron to form magnetic particles. The reduction-diffusion method can be performed using an inexpensive rare earth oxide and thus is considered a preferred technique.

Unfortunately, the rare earth-iron-nitrogen-based magnetic powder disadvantageously has low heat resistance (low oxidation resistance). When used to form bonded magnets, the magnetic powder with low heat resistance will provide low magnetic properties due to heating in the mixing and molding steps. In some cases, bonded magnets are exposed to a high temperature of 100° C. or more during operation. The magnetic properties may deteriorate during such operation. Proposed solutions to these problems involve a technique for improving the heat resistance of the rare earth-iron-nitrogen-based magnetic powder, such as forming a rare earth-iron-nitrogen-based magnetic powder with iron (Fe) partially replaced by another element, reducing the content of fine powder, or forming an oxidation-resistant coating on the surface of the particles.

For example, Patent Document 1 and Non-Patent Documents 1 and 2 propose performing a melting or reduction-diffusion method to form a rare earth-iron-nitrogen-based magnetic powder with iron (Fe) partially replaced by manganese (Mn) so that it has improved resistance to heat and oxidation. Specifically, Patent Document 1 discloses a magnetic material represented by the general formula: $R_\alpha Fe_{(100-\alpha-\beta-\gamma)}Mn_\beta N_\gamma$, where $3 \leq \alpha \leq 20$, $0.5 \leq \beta \leq 25$, and $17 \leq \gamma \leq 25$ and having an average particle size of 10 µm or more and discloses that such a magnetic material is produced by a process that includes mixing and melting Sm, Fe, and Mn in a high-frequency melting furnace to form an alloy; and heating the alloy in an ammonia mixture stream to form a Sm—Fe—Mn—N-based powder and that such a magnetic material has high oxidation resistance and high temperature characteristics (see claim 1 and paragraphs [0048] to [0050] and [0070] of Patent Document 1). Non-Patent Documents 1 and 2 disclose a $Sm_2(Fe,Mn)_{17}N_x$ (x>4) magnetic powder with Fe partially replaced by Mn, which is produced by a reduction-diffusion method and exhibits higher heat resistance than a $Sm_2Fe_{17}N_3$ magnetic powder (see page 881 of Non-Patent Document 1).

Patent Document 2 discloses a method for producing a rare earth-transition metal-nitrogen-based magnetic alloy powder, including the steps of (a) crushing a mother alloy including a rare earth metal (R) and a transition metal (TM) to form a mother alloy powder; (b) mixing the mother alloy powder with a rare earth oxide powder and a reducing agent and heating the mixture in an inert gas; (c) embrittling and crushing the resulting reaction product; (d) nitriding the resulting reaction product powder to form a magnetic alloy powder; and (e) washing the resulting magnetic alloy powder with water. Patent Document 2 further discloses that the magnetic alloy powder has a very low content of fine particles with sizes less than 1 µm and thus provides a magnetic material that is easy to handle in the atmosphere and has high resistance to heat and weather (see claim 1 and paragraph [0025] of Patent Document 2).

Patent Document 3 discloses a method for producing a rare earth-iron-nitrogen-based magnetic powder for forming bonded magnets, including the steps of: crushing rare earth-iron-nitrogen-based coarse magnetic particles in an organic solvent containing phosphoric acid; and placing and treating the resulting magnetic particles in phosphoric acid to form a phosphate coating on their surface so that they can form a magnet with high weather resistance (see claim 1 and paragraph [0002] of Patent Document 3). Patent Document 4 discloses a rare earth bonded magnet comprising a resin and anisotropic rare earth alloy-based magnetic particles having a surface coating metal layer, and specifically discloses that Sm—Fe—N alloy magnetic particles produced by a reduction-diffusion method are treated in Zn vapor so that magnetic particles having a 0.05 µm-thick Zn surface coating layer are obtained. Patent Document 4 discloses that a high-performance, high-heat resistance, bonded magnet, of which the magnetization is resistant to a high temperature of approximately 180° C. or more for a long period and which is not found in the conventional art, is obtained using such magnetic particles (see claim 1 and paragraphs [0068] and [0071] of Patent Document 4).

Patent Document 1: Japanese Unexamined Patent Application, Publication No. H08-055712
Patent Document 2: Japanese Unexamined Patent Application, Publication No. 2005-272986
Patent Document 3: Japanese Patent No. 5071160
Patent Document 4: Japanese Unexamined Patent Application, Publication No. 2003-168602
Non-Patent Document 1: IEEJ Transactions on Fundamentals and Materials, 124 (2004) 881
Non-Patent Document 2: Proc. 12th Int. Workshop on RE Magnets and their Applications, Canberra, (1992) 218

DISCLOSURE OF THE INVENTION

Problems to be Solved by the Invention

In a wide range of fields including general home electrical appliances, communication and audio equipment, medical equipment, and general industrial equipment, there is an increasing demand for iron-based bonded magnets containing a rare earth element and produced through molding a mixture of a magnetic powder and a resin binder. There is also increasing severity of conditions for the storage and transportation of bonded magnet materials and for the use of products. Thus, a need exists for a magnetic powder that has higher heat resistance and higher properties such as higher coercive force and is useful for forming bonded magnets.

Unfortunately, the techniques proposed in the conventional art are not considered satisfactory. For example, the partial replacement of iron (Fe) by manganese (Mn) disclosed in Patent Document 1 and the methods disclosed in Non-Patent Documents 1 and 2 have the problem of a reduction in magnetization, although they can provide a magnetic powder with improved heat resistance. In fact, Patent Document 1 shows that a magnetic material with a Mn content of 3.5 at % (Example 1) has a saturation magnetization of 84 emu/g while a magnetic material with an increased Mn content of 10.3 at % (Example 4) has a decreased saturation magnetization of 72 emu/g (see Table 1 in paragraph [0069] of Patent Document 1). Non-Patent Document 1 also shows that the Curie temperature $T_c$ and maximum magnetization $\sigma_m$ of a $Sm_2(Fe,Mn)_{17}N$ compound decrease monotonically with increasing Mn content (see page 885 of Non-Patent Document 1). There is also room for heat resistance improvement in the techniques disclosed in Patent Documents 2 to 4, which include reducing the content of fine powder and forming an oxidation-resistant coating on the surface of particles, although they are effective to a certain extent.

The inventors have conducted intensive studies to solve the problems with the rare earth-iron-nitrogen $(R_2Fe_{17}N_3)$-based magnetic powder having a nucleation-type coercivity mechanism. As a result, the inventors have found that a magnetic powder can exhibit both high heat resistance and high magnetic properties when it has a core-shell structure including: an $R_2Fe_{17}N_3$ compound phase as a main internal volume part (core); and a particle surface layer (shell layer) of a phase richer in rare earth (R) than $R_2Fe_{17}N_3$.

The present invention has been completed based on the findings. It is an object of the present invention to provide a rare earth-iron-nitrogen-based magnetic powder having high heat resistance and high magnetic properties and to provide a method for producing such a magnetic powder. It is another object of the present invention to provide a compound that contains such a rare earth-iron-nitrogen-based magnetic powder and is useful for forming bonded magnets and to provide a bonded magnet containing such a rare earth-iron-nitrogen-based magnetic powder.

Means for Solving the Problems

The present invention encompasses aspects (1) to (15) shown below. In the present description, any numerical range specified using "to" refers to a range including the upper and lower limits of the range. For example, the expression "a to b" has the same meaning as "a or more and b or less".

(1) A rare earth-iron-nitrogen-based magnetic powder including a rare earth element (R), iron (Fe), and nitrogen (N) as main constituents, the magnetic powder having an average particle size of 1.0 μm or more and 10.0 μm or less and having a rare earth element (R) content of 22.0% by mass or more and 30.0% by mass or less and a nitrogen (N) content of 2.5% by mass or more and 4.0% by mass or less, the magnetic powder including magnetic particles including: a core having a crystal structure selected from the group consisting of $Th_2Zn_{17}$-type, $Th_2Ni_{17}$-type, and $TbCu_7$-type crystal structures; and a shell layer having a thickness of 1 nm or more and 30 nm or less and provided on the surface of the core, the shell layer containing a rare earth element (R) and iron (Fe) in an atomic ratio R/Fe of 0.3 or more and 5.0 or less and having a nitrogen (N) content of more than 0 at % and 10 at % or less, the magnetic powder further including particles of a compound including a rare earth element (R) and phosphorus (P).

(2) The magnetic powder according to aspect (1), wherein the shell layer has a two-layer structure including an outer layer and an inner layer, the outer layer includes oxygen (O) and calcium (Ca) in addition to the rare earth element (R), iron (Fe), and nitrogen (N), and the inner layer includes oxygen (O) in addition to the rare earth element (R), iron (Fe), and nitrogen (N) and is free of calcium (Ca).

(3) The magnetic powder according to aspect (2), wherein the shell layer has a two-layer structure including an outer layer and an inner layer, and the outer layer has an atomic ratio R/Fe of A, the inner layer has an atomic ratio R/Fe of B, and B<A is satisfied.

(4) The magnetic powder according to any one of aspects (1) to (3), including samarium (Sm) as the rare earth element (R).

(5) The magnetic powder according to any one of aspects (1) to (4), further including a phosphoric acid-derived compound coating on the uppermost surfaces of the magnetic particles.

(6) The magnetic powder according to any one of aspects (1) to (5), having a rate of coercive force retention of 70% or more that is calculated as the percentage ratio $(H_{c,300}/H_c)$ of the coercive force $(H_{c,300})$ of the magnetic powder measured after the magnetic powder is heated at 300° C. for 1 hour in an argon (Ar) atmosphere to the coercive force $(H_c)$ of the magnetic powder measured before the heating.

(7) A compound for forming a bonded magnet, the compound including: the magnetic powder according to any one of aspects (1) to (6); and a resin binder.

(8) A bonded magnet including: the magnetic powder according to any one of aspects (1) to (6); and a resin binder.

(9) A method for producing the rare earth-iron-nitrogen-based magnetic powder according to any one of aspects (1) to (6), the method including:

a preparation step that includes preparing rare earth oxide particles and rare earth-iron alloy particles having a crystal structure selected from the group consisting of $Th_2Zn_{17}$-type, $Th_2Ni_{17}$-type, and $TbCu_7$-type crystal structures;

a mixing step that includes mixing 100 parts by mass of the rare earth-iron alloy particles with 1 to 20 parts by mass of the rare earth oxide particles so as to form a raw material mixture including rare earth-iron alloy particles with a particle size of 15.0 μm or less and rare earth oxide particles with a particle size of 2.0 μm or less;

a reduction-diffusion treatment step that includes adding to, and mixing with the raw material mixture, a reducing agent in an amount 1.1 to 10.0 times the equivalent of the reducing agent required to reduce an oxygen component in the raw material mixture and includes heating the mixture of the reducing agent and the raw material mixture at a temperature in the range of 730 to 1,050° C. in a non-oxidizing atmosphere to produce a reduction-diffusion reaction product; and a heating and nitriding step that includes heating and nitriding the reduction-diffusion reaction product at a temperature in the range of 300 to 500° C. in a gas stream including nitrogen and/or ammonia to form a nitridation reaction product, wherein one or both of the preparation step and the mixing step include forming a phosphoric acid-derived compound coating on the rare earth-iron alloy particles.

(10) The method according to aspect (9), wherein the mixing step includes mixing and crushing the rare earth-iron alloy particles and the rare earth oxide particles in a crushing solvent containing a phosphoric acid-based surface treatment agent to form a phosphoric acid-derived compound coating on the rare earth-iron alloy particles.

(11) The method according to aspect (9) or (10), further including the step of subjecting the reduction-diffusion reaction product to disintegration treatment before the heating and nitriding.

(12) The method according to any one of aspects (9) to (11), further including a wet treatment step that includes placing the reduction-diffusion reaction product and/or the nitridation reaction product in a washing liquid including water and/or a glycol to allow the reduction-diffusion reaction product and/or the nitridation reaction product to disintegrate and thus to reduce the content of a reducing agent-derived component in the reduction-diffusion reaction product and/or the nitridation reaction product.

(13) The method according to any one of aspects (9) to (12), further including the step of forming a phosphoric acid-derived compound coating on the surface of the product resulting from the heating and nitriding.

(14) The method according to any one of aspects (9) to (13), wherein the raw material mixture has a weight loss on heating of less than 1% by mass.

(15) The method according to any one of aspects (9) to (14), wherein heating the mixture of the reducing agent and the raw material mixture is performed for 0 to 10 hours to produce the reduction-diffusion reaction product.

Effects of the Invention

The present invention provides a rare earth-iron-nitrogen-based magnetic powder having high heat resistance and high magnetic properties and provides a method for producing such a magnetic powder. The present invention also provides a compound that contains such a rare earth-iron-nitrogen-based magnetic powder and is useful for forming bonded magnets, and provides a bonded magnet containing such a rare earth-iron-nitrogen-based magnetic powder.

PREFERRED MODE FOR CARRYING OUT THE INVENTION

Figure 1:
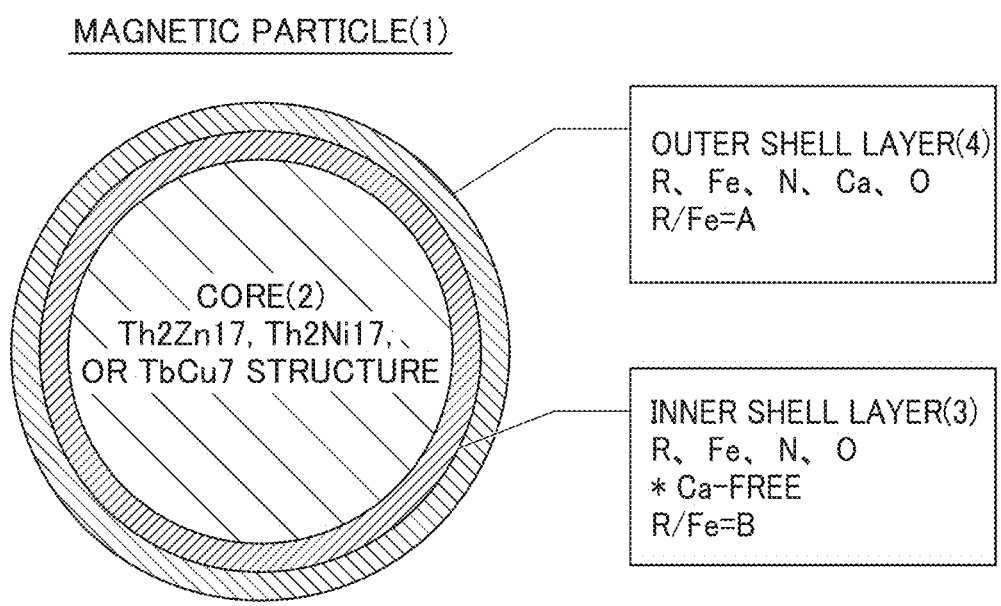
FIG. 1 is a schematic cross-sectional view of an example of a magnetic particle.

Specific modes of the present invention (hereinafter referred to as "embodiments") will be described. It should be noted that the embodiments described below are not intended to limit the present invention and may be altered or modified in various ways without departing from the gist of the present invention.

Rare Earth-Iron-Nitrogen-Based Magnetic Powder

The rare earth-iron-nitrogen-based magnetic powder according to an embodiment (hereinafter also collectively referred to as "the magnetic powder") includes a rare earth element (R), iron (Fe), and nitrogen (N) as main constituents. The magnetic powder has an average particle size of 1.0 μm or more and 10.0 μm or less and has a rare earth element (R) content of 22.0% by mass or more and 30.0% by mass or less and a nitrogen (N) content of 2.5% by mass or more and 4.0% by mass or less. The magnetic powder includes magnetic particles including: a core having a crystal structure selected from the group consisting of $Th_2Zn_{17}$-type, $Th_2Ni_{17}$-type, and $TbCu_7$-type crystal structures; and a shell layer having a thickness of 1 nm or more and 30 nm or less and provided on the surface of the core. The shell layer contains a rare earth element (R) and iron (Fe) in an atomic ratio R/Fe of 0.3 or more and 5.0 or less and has a nitrogen (N) content of more than 0 at % and 10 at % or less. The magnetic powder further contains particles of a compound including a rare earth element (R) and phosphorus (P).

The rare earth element (R) preferably includes, but is not limited to, at least one element selected from the group consisting of lanthanum (La), cerium (Ce), samarium (Sm), praseodymium (Pr), neodymium (Nd), gadolinium (Gd), and terbium (Tb). Alternatively, the rare earth element (R) preferably includes at least one element selected from the group consisting of dysprosium (Dy), holmium (Ho), erbium (Er), thulium (Tm), and ytterbium (Yb). In particular, the rare earth element (R) preferably includes samarium (Sm) and/or neodymium (Nd) so that the embodiment will bring about a significantly advantageous effect. In a case where the magnetic powder is for use in bonded magnets, samarium (Sm) preferably makes up at least 50 at % of the rare earth element (R). In a case where the magnetic powder is for use in high-frequency magnetic materials, neodymium (Nd) preferably makes up at least 50 at % of the rare earth element (R).

The magnetic powder may contain an additional component in addition to the rare earth element (R), iron (Fe), and nitrogen (N). For example, the magnetic powder may further contain cobalt (Co), nickel (Ni), manganese (Mn), or chromium (Cr). The content of nickel (Ni), manganese (Mn), or chromium (Cr) in the magnetic powder, however, is preferably as low as possible, because they may cause a reduction in magnetization. In a case where the magnetic powder contains an additional component in addition to the rare earth element (R), iron (Fe), and nitrogen (N), the content of the additional component in the magnetic powder is preferably 10 at % or less, more preferably 5 at % or less, even more preferably 1 at % or less. However, the content of cobalt (Co) in the magnetic powder may be 20 at % or less.

The magnetic powder may include the rare earth element (R), iron (Fe), and nitrogen (N) with the remainder being unavoidable impurities.

The magnetic powder according to the embodiment has an average particle size of 1.0 µm or more and 10.0 µm or less. If the average particle size is less than 1.0 µm, the magnetic powder will be difficult to handle. Moreover, the particles with an average particle size of less than 1.0 µm may have a low core volume fraction. Since the core has high magnetic properties, the low core volume fraction may make it difficult to increase the magnetic properties of the magnetic powder. The average particle size may be 2.0 µm or more or 3.0 µm or more. If the average particle size is more than 10 µm, the magnetic powder will be less likely to provide a magnetic material having a sufficiently high coercive force ($H_c$). The average particle size may be 9.0 µm or less or 8.0 µm or less.

The magnetic powder according to the embodiment has a rare earth element (R) content of 22.0% by mass or more and 30.0% by mass or less. If the rare earth element (R) content is less than 22% by mass based on the total mass, the magnetic powder will have a low coercive force. If the rare earth element (R) content is more than 30% by mass, the magnetic powder will have a thick shell layer, which has relatively low magnetization, and will have an increased content of compound particles including the rare earth element (R) and phosphorus (P) (RP compound particles) or an increased content of an $RFe_3$ nitride phase. This will lead to a reduction in remanent magnetization ($\sigma_r$). The rare earth element (R) content is preferably 24.0% by mass or more and 29.0% by mass or less, more preferably 25.0% by mass or more and 28.0% by mass or less.

The magnetic powder according to the embodiment also has a nitrogen (N) content of 2.5% by mass or more and 4.0% by mass or less. If the nitrogen (N) content is less than 2.5% by mass, the magnetic powder will contain poorly nitrided particles. Such particles have low saturation magnetization and low magnetic anisotropy. This will cause the magnetic powder to have low remanent magnetization and low coercive force. If the nitrogen (N) content is more than 4.0% by mass, the magnetic powder will have an increased content of excessively nitrided particles and thus have low remanent magnetization and low coercive force. The nitrogen (N) content is preferably 2.8% by mass or more and 3.6% by mass or less, more preferably 2.9% by mass or more and 3.4% by mass or less.

Moreover, the magnetic particles according to the embodiment include a core having a crystal structure selected from the group consisting of $Th_2Zn_{17}$-type, $Th_2Ni_{17}$-type, and $TbCu_7$-type crystal structures. The magnetic particles having a core with such a crystal structure will have high magnetic properties. The crystal structure of the core can be determined from the positions of peaks observed in ordinary powder X-ray diffraction. In this case, the shell layer can also be measured, which has a thickness sufficiently smaller than that of the core. This means that the shell layer has little influence on the observed X-ray diffraction pattern.

The magnetic particles according to the embodiment include a shell layer on the surface of the core. The shell layer has a thickness of 1 nm or more and 30 nm or less, contains a rare earth element (R) and iron (Fe) in an atomic ratio R/Fe of 0.3 or more and 5.0 or less, and has a nitrogen (N) content of more than 0 at % and 10 at % or less. Such a shell layer at the surface portion of the magnetic particles with an average size of 1 to 10 µm (or on the surface of the core) allows the magnetic particles to have both high heat resistance and high magnetic properties. Such a shell layer is considered an R phase, an $RFe_2$ phase, an $RFe_3$ phase, or a nitride of any of these phases, which is richer in rare earth than the $R_2Fe_{17}N_3$ phase. If the atomic ratio R/Fe is less than 0.3, the shell layer will have a composition close to that of the core and will not be expected to have high heat resistance. An atomic ratio R/Fe of more than 5.0 may cause a reduction in remanent magnetization. The atomic ratio R/Fe is preferably 0.5 or more and 3.0 or less. If the thickness is less than 1 nm, the shell layer will be less effective in improving heat resistance. If the thickness is more than 30 nm, the shell layer will cause a reduction in remanent magnetization. The shell layer preferably has a thickness of 3 nm or more and 20 nm or less. If the shell layer contains no nitrogen, the shell layer may cause a reduction in the remanent magnetization, coercive force, and heat resistance of the magnetic powder. If the shell layer has a nitrogen content of more than 10 at %, the shell layer may also cause a reduction in the remanent magnetization, coercive force, and heat resistance of the magnetic powder.

The magnetic powder according to the embodiment contains particles of a compound including a rare earth element (R) and phosphorus (P) (also referred to as RP compound particles). The RP compound particles include a rare earth phosphide phase, such as a samarium phosphide (SmP) phase. The RP compound will act to inhibit the production of an $RFe_2$ or $RFe_3$ phase, which will cause deterioration of coercivity or heat resistance. The presence of the RP compound particles in the magnetic powder will inhibit the deterioration of coercivity or heat resistance. The content of the RP compound particles in the magnetic powder may be at any appropriate level. For inhibition of the deterioration, however, the content of the RP compound particles in the magnetic powder may be 0.01% by mass or more, 0.1% by mass or more, or 1.0% by mass or more. If the content of the RP compound particles is too high, the magnetic powder may have low remanent magnetization. The content of the RP compound particles in the magnetic powder may be 15.0% by mass or less, 10.0% by mass or less, or 5.0% by mass or less. The size of the RP compound particles is typically, but not limited to, approximately 100 nm to approximately 5 µm.

In the magnetic particle, the shell layer preferably has a two-layer structure including an outer layer and an inner layer. More preferably, the outer layer includes oxygen (O) and calcium (Ca) in addition to the rare earth element (R), iron (Fe), and nitrogen (N), and the inner layer includes oxygen (O) in addition to the rare earth element (R), iron (Fe), and nitrogen (N) and is free of calcium (Ca). The structure of such a magnetic particle will be described with reference to FIG. 1. FIG. 1 is a schematic cross-sectional view of a model of such a magnetic particle. The magnetic particle 1 includes a core 2, an inner shell layer 3 on the surface of the core 2, and an outer shell layer 4 on the surface of the inner shell layer 3. The core 2 has a crystal structure selected from the group consisting of $Th_2Zn_{17}$-type, $Th_2Ni_{17}$-type, and $TbCu_7$-type crystal structures. The outer shell layer 4 contains calcium (Ca), whereas the inner shell layer 3 is free of calcium (Ca). The two-layer structure composed of a Ca-containing outer layer and a Ca-free inner layer is expected to be effective in inhibiting oxygen diffusion. As used herein, the expression "free of calcium (Ca) (Ca-free)" means that the Ca content is less than 1.0 at %.

The magnetic powder preferably satisfies the relation B<A, in which A is the atomic ratio R/Fe of the outer layer, and B is the atomic ratio R/Fe of the inner layer. Similar to Ca, the outer layer with a composition richer in rare earth (R) than the inner layer is also expected to be effective in inhibiting oxygen diffusion.

The magnetic powder preferably contains samarium (Sm) as the rare earth element (R). This will make the magnetic powder suitable for use in bonded magnets.

The magnetic particles preferably have a phosphoric acid-derived compound coating on their uppermost surface. The magnetic particles having a known phosphoric acid-derived compound coating on the outer side of the shell layer can have high stability in a humid environment. The phosphoric acid-derived compound coating preferably has a thickness smaller than that of the shell layer. The thickness of the phosphoric acid-derived compound coating is typically 30 nm or less, preferably 5 nm or more and 20 nm or less. If the thickness is more than 30 nm, the phosphoric acid-derived compound coating may cause a reduction in magnetic properties.

The magnetic powder may have a remanent magnetization ($\sigma_r$) of 80 Am$^2$/kg or more, 90 Am$^2$/kg or more, or 100 Am$^2$/kg or more. The magnetic powder may also have a coercive force ($H_c$) of 600 kA/m or more, 800 kA/m or more, 1,000 kA/m or more, 1,200 kA/m or more, or 1,400 kA/m or more. The magnetic powder may also have a rate ($H_{c,300}/H_c$) of coercive force retention of 70% or more, 75% or more, 80% or more, 85% or more, or 90% or more. The rate ($H_{c,300}/H_c$) of coercive force retention may be defined as the percentage ratio of the coercive force ($H_{c,300}$) of the magnetic powder measured after the magnetic powder is heated at 300° C. for 1.5 hours (90 minutes) in an argon (Ar) atmosphere to the coercive force ($H_c$) of the magnetic powder measured before the heating.

The magnetic powder according to the embodiment features not only high heat resistance and high weather resistance but also high magnetic properties, specifically, high magnetization and high coercive force. Specifically, the magnetic powder according to the embodiment has higher heat resistance than the conventional magnetic powder such as Sm$_2$Fe$_{17}$N$_3$ powder. Moreover, the magnetic properties of the magnetic powder according to the embodiment are comparable to or higher than those of a highly heat-resistant R$_2$(Fe,M)$_{17}$N$_x$ (M=Cr or Mn) magnetic powder, in which iron (Fe) is partially replaced by another element (Mn or Cr).

The magnetic powder according to the embodiment, which has high heat resistance and high magnetic properties, is suitable for being mixed with a resin binder and for forming bonded magnets. In some cases, a magnetic powder is exposed to high temperatures during the production of bonded magnets from the magnetic powder. For example, in some cases where a magnetic powder and a highly heat-resistant thermoplastic resin binder, such as a polyphenylene sulfide or aromatic polyamide resin binder, are used to form bonded magnets, the materials are exposed to a temperature higher than 300° C. during the step of mixing and kneading the magnetic powder and the resin binder or injection-molding the mixture. The magnetic properties of the magnetic powder according to the embodiment will be less likely to deteriorate even after exposure to such a high temperature.

Method for Producing the Rare Earth-Iron-Nitrogen-Based Magnetic Powder

The rare earth-iron-nitrogen-based magnetic powder may be produced by any appropriate method that can produce a magnetic powder satisfying the requirements described above. Preferably, however, the rare earth-iron-nitrogen-based magnetic powder is produced by a reduction-diffusion method, and in particular, the rare earth-iron-nitrogen-based magnetic powder is preferably produced by the method described below.

The method according to an embodiment for producing the rare earth-iron-nitrogen-based magnetic powder includes: a preparation step that includes preparing rare earth oxide particles and rare earth-iron alloy particles having a crystal structure selected from the group consisting of Th$_2$Zn$_{17}$-type, Th$_2$Ni$_{17}$-type, and TbCu$_7$-type crystal structures; a mixing step that includes mixing 100 parts by mass of the rare earth-iron alloy particles with 1 to 20 parts by mass of the rare earth oxide particles so as to form a raw material mixture including rare earth-iron alloy particles with a particle size of 15.0 µm or less and rare earth oxide particles with a particle size of 2.0 µm or less; a reduction-diffusion treatment step that includes adding to, and mixing with the raw material mixture, a reducing agent in an amount 1.1 to 10.0 times the equivalent of the reducing agent required to reduce the oxygen component in the raw material mixture and includes heating the mixture of the reducing agent and the raw material mixture at a temperature in the range of 730 to 1,050° C. in a non-oxidizing atmosphere to produce a reduction-diffusion reaction product; and a heating and nitriding step that includes heating and nitriding the reduction-diffusion reaction product at a temperature in the range of 300 to 500° C. in a gas stream including nitrogen and/or ammonia to form a nitridation reaction product. In the method, one or both of the preparation step and the mixing step include forming a phosphoric acid-derived compound coating on the rare earth-iron alloy particles. Each of the steps will be described in detail below.

Preparation Step

The preparation step includes preparing rare earth-iron alloy particles and rare earth oxide particles. The rare earth-iron alloy particles are a raw material for mainly forming the cores. The rare earth-iron alloy particles have a crystal structure selected from the group consisting of Th$_2$Zn$_{17}$-type, Th$_2$Ni$_{17}$-type, and TbCu$_7$-type crystal structures. For example, the rare earth-iron alloy particles have the composition R$_2$Fe$_{17}$. The rare earth-iron alloy particles may be selected so as to have particle sizes of at most 15.0 µm in the subsequent mixing step. This means that the particles to be used may have particle sizes of at most 15.0 µm or particle sizes of more than 15 µm. If the particles to be used have particle sizes of more than 15 µm, they may be crushed into particles with particle sizes of at most 15 µm in the mixing step. As used herein, the term "alloy" is intended to include not only a solid solution of two or more metals but also an intermetallic compound and a mixed crystal. The alloy may be crystalline or amorphous.

The rare earth-iron alloy particles (e.g., R$_2$Fe$_{17}$ particles) can be produced by a known method, such as a reduction-diffusion method, a melt casting method, or a liquid quenching method. Among them, the reduction-diffusion method can directly produce alloy particles with desired particle sizes under adjusted conditions, including an adjusted size of iron particles used as a raw material and an adjusted temperature for the reduction-diffusion reaction. Alternatively, the alloy particles may be produced by crushing, into particles with desired sizes, a starting material including alloy particles with larger sizes or including alloy lumps.

In some cases, depending on the production conditions, the rare earth-iron alloy particles produced by the reduction-diffusion method are in the form of hydrogen-containing products (hydrogen-containing, rare earth-iron alloy particles, such as R$_2$Fe$_{17}$H$_x$ particles), which contain hydrogen in their intermetallic compound component. In some cases, such hydrogen-containing products have a lattice constant larger than that of the rare earth-iron alloy ($R_2Fe_{17}$) although their crystal structure is the same as that of the rare earth-iron alloy. In some cases, alloy particles produced by the melt casting method or the liquid quenching method are also in the form of hydrogen-containing products having a larger lattice constant as mentioned above when they have undergone hydrogen absorption and crushing. Such alloy particles containing hydrogen are also acceptable. In such cases, it should be noted that the rare earth-iron alloy particles preferably have a water content (a weight loss on heating) of less than 1% by mass.

The rare earth oxide particles are a raw material for mainly forming the shell layers. The rare earth element (R) constituting the rare earth oxide particles may be the same as or different from the rare earth element constituting the rare earth-iron alloy particles. Preferably, they are the same. The rare earth oxide particles may be selected so as to have particle sizes of at most 2.0 µm in the subsequent mixing step. This means that the particles to be used may have particle sizes of at most 2.0 µm or particle sizes of more than 2.0 µm. If the particles to be used have particle sizes of more than 2.0 µm, they may be crushed into particles with particle sizes of at most 2.0 µm in the mixing step.

Mixing Step

The mixing step includes mixing 100 parts by mass of the prepared rare earth-iron alloy particles with 1 to 20 parts by mass of the prepared rare earth oxide particles to form a raw material mixture. If the amount of the rare earth oxide particles is less than 1 part by mass, α-Fe will form on the surface of the rare earth-iron alloy particles (e.g., $R_2F_{17}$ particles) resulting from the reduction-diffusion treatment described below, which will cause the final magnetic powder product to have low coercive force. If the amount of the rare earth oxide particles is more than 20 parts by mass, a relatively large amount of an $RFe_3$ compound and/or an $RFe_2$ compound, which is richer in rare earth (R) than the rare earth-iron alloy, will form to reduce the yield of the final magnetic powder product.

In the production method according to the embodiment, one or both of the preparation step and the mixing step include forming a phosphoric acid-derived compound coating on the rare earth-iron alloy particles. This means that in the mixture resulting from the mixing step, the rare earth-iron alloy particles have a phosphoric acid-derived compound coating. For example, in a case where the rare earth-iron alloy particles as prepared have particle sizes of at most 15.0 µm, the phosphoric acid-derived compound coating may be formed on the alloy particles in advance of the mixing step. Alternatively, the phosphoric acid-derived compound coating may be formed on the rare earth-iron alloy particles during the mixing step. In either case, the phosphoric acid-derived compound coating only has to be provided on the rare earth-iron alloy particles in the mixture resulting from the mixing step. The phosphoric acid-derived compound coating provided in this way allows the magnetic powder product to have high coercive force and high heat resistance. Specifically, in the reduction-diffusion reaction step described below, the phosphorus (P) in the phosphoric acid-derived compound coating can react with excess rare earth element (R) to form precipitated particles of a compound including the rare earth element (R) and phosphorus (P) (RP compound particles). The RP compound particles can inhibit the production of $RFe_2$ and $RFe_3$ phases, which would otherwise cause the magnetic powder to have low coercive force or low heat resistance. In contrast, the use of rare earth-iron alloy particles having no phosphoric acid-derived compound coating may cause the production of coarse $RFe_2$ and $RFe_3$ phases separately from the production of the shell layer and cause the magnetic powder to have low coercive force or low heat resistance.

The phosphoric acid-derived compound coating may be formed by subjecting the rare earth-iron alloy particles to surface treatment with a phosphoric acid-based surface treatment agent. A known compound such as one disclosed in Patent Document 3 may be used to form the phosphoric acid-based surface treatment agent. Specifically, the phosphoric acid-based surface treatment agent may include phosphoric acid, phosphorus acid, hypophosphorous acid, pyrophosphoric acid, linear polyphosphoric acid, cyclic metaphosphoric acid, ammonium phosphate, magnesium ammonium phosphate, zinc phosphate, calcium zinc phosphate, manganese phosphate, or iron phosphate. Phosphoric acid may be mixed with a chelating agent or a neutralizing agent to form the surface treatment agent.

The surface treatment may be performed using a known method. For example, the coating may be formed in the preparation step, which may include immersing the rare earth-iron alloy particles in a solution containing the phosphoric acid-based surface treatment agent to form the coating; and then performing solid-liquid separation to collect the rare earth-iron alloy particles having the coating. Alternatively, the coating may be formed in the mixing step, which may include immersing a preliminary mixture of the rare earth-iron alloy particles and the rare earth oxide particles in a solvent containing the phosphoric acid-based surface treatment agent to form the coating. During the coating formation, the rare earth-iron alloy particles and/or the rare earth oxide particles may be crushed in the solvent using a crushing machine, such as a medium stirring mill. The solvent may be any type. For example, the solvent may be an organic solvent, examples of which include alcohols, such as isopropyl alcohol, ethanol, and methanol; lower hydrocarbons, such as pentane and hexane; aromatic compounds, such as benzene, toluene, and xylene; ketones; and any mixture of them.

The phosphoric acid-derived compound coating may be formed in one or both of the preparation step and the mixing step. Preferably, the phosphoric acid-derived compound coating is formed in the mixing step. In this case, the mixing step preferably includes mixing and crushing the rare earth-iron alloy particles and the rare earth oxide particles in a crushing solvent containing the phosphoric acid-based surface treatment agent to form a phosphoric acid-derived compound coating on the rare earth-iron alloy particles. In this case, the particles resulting from the crushing of the rare earth-iron alloy particles have newly formed surfaces. The mixing step including forming the coating also enables the formation of the coating on the newly formed surfaces. Moreover, the mixing and crushing of the raw material particles (the rare earth-iron alloy particles and the rare earth oxide particles) and the formation of the coating are achieved at the one time, which will contribute to a reduction in production costs.

The optimum amount of the phosphoric acid-derived compound coating depends on the size and surface area of the rare earth-iron alloy particles and cannot be uniquely determined. In a case where the coating is formed using a solvent containing the phosphoric acid-based surface treatment agent, the phosphoric acid may be used in an amount of 0.1 to 0.5 mol/kg based on the total weight of the rare earth-iron alloy particles.

The raw material mixture resulting from the mixing step includes rare earth-iron alloy particles having particle sizes of at most 15.0 µm and having the phosphoric acid-derived compound coating; and rare earth oxide particles having particle sizes of at most 2.0 µm. In other words, the rare earth-iron alloy particles in the raw material mixture have a maximum particle size of 15.0 µm or less, and the rare earth oxide particles in the raw material mixture have a maximum particle size of 2.0 µm or less. The rare earth-iron alloy particles are a raw material for forming the cores of the magnetic particles. In the subsequent heat treatment for reduction-diffusion, the particles undergo growth, aggregation, sintering, and shell layer formation. When these factors are taken into account, the alloy particles desirably have a maximum particle size nearly equal to the particle size of the magnetic powder (1.0 µm or more and 10.0 µm or less). Therefore, the alloy particles in the raw material mixture desirably has particle sizes of at most 15.0 µm. The rare earth oxide particles are desirably fine so that the shell layer can be uniformly formed with a desired thickness. Therefore, the oxide particles in the raw material mixture should have particle sizes of at most 2.0 µm. The oxide particles preferably have particle sizes of at most 1.5 µm, more preferably at most 1.0 µm. The particle sizes can be easily determined using a scanning electron microscope (SEM).

Mixing operation to mix the rare earth-iron alloy particles with the rare earth oxide particles is an important factor for the mixing step. For the formation of a uniform shell layer, it is desirable that the rare earth oxide particles have a size as small as possible and be uniformly dispersed. The mixing may be performed by either a dry method or a wet method. The dry mixing method may be performed in an inert gas atmosphere using a dry mixer, such as Henschel mixer, Conpix, Mechano Hybrid, Mechano Fusion, Nobilta, Hybridization System, Miralo, tumbler mixer, Theta Composer, or Spartan Mixer. The wet mixing may be performed using a wet mixer, such as bead mill, ball mill, Nanomizer, wet cyclone, homogenizer, dissolver, or Filmix.

While being mixed together, the rare earth-iron alloy particles and the rare earth oxide particles may be ground into fine particles with desired sizes. In this case, the phosphoric acid-derived compound coating may be formed during the fine grinding. The simultaneous adding and fine grinding of the rare earth oxide particles makes it possible to obtain a uniform mixture. The fine grinding may be performed using a dry pulverizer, such as a jet mill, or a wet pulverizer, such as a vibration mill, a rotary ball mill, or a medium stirring mill. The wet fine grinding may be performed using, as a grinding medium, an organic solvent, examples of which include ketones, lower hydrocarbons, such as hexane, aromatic compounds, such as toluene, alcohols, such as ethanol and isopropyl alcohol, fluorinated inert liquids, and any mixture thereof. An organic solvent containing the phosphoric acid-based surface treatment agent, such as orthophosphoric acid, may also be used as the grinding solvent. In this case, the phosphoric acid-derived compound coating can be formed during the fine grinding. This method is preferred because it simultaneously allows the formation of the phosphoric acid-derived compound coating on pulverized rare earth-iron alloy particles and the fine grinding of the rare earth oxide particles and allows the resulting particles to be dispersed uniformly. In the wet method, the raw material mixture may be obtained by drying the slurry, which results from the fine grinding, to remove the organic solvent.

The raw material mixture preferably has a weight loss on heating of less than 1% by mass. The weight loss on heating corresponds to the amount of impurities in the dried mixture particles, in which water is the main component of the impurities. The impurities may also include the organic solvent used during the mixing, a dispersing aid, and carbon depending on the type of the handling process. If the weight loss on heating is more than 1% by mass, emission of a large amount of water vapor and carbon dioxide gas may occur during the subsequent reduction-diffusion treatment. The emission of a large amount of water vapor and carbon dioxide gas will cause oxidation of the reducing agent (e.g., Ca granules) to inhibit the reduction-diffusion reaction. This will result in the formation of $\alpha$-Fe, which is undesirable for obtaining high magnetic properties, in the final magnetic powder product. It is therefore desirable to thoroughly dry the raw material mixture under reduced pressure. The thorough drying will sufficiently remove not only water but also carbon from the raw material mixture. The weight loss on heating may be determined by measuring the weight loss a resulting from the heating of 50 g of the sample at 400° C. for 5 hours in vacuum.

Reduction-Diffusion Treatment Step

The reduction-diffusion treatment step includes adding a reducing agent to the resulting raw material mixture, mixing them, and heating the mixture of the reducing agent and the raw material mixture to form a reduction-diffusion reaction product. The reducing agent is added in an amount 1.1 to 10.0 times the equivalent required to reduce the oxygen component in the raw material mixture. The heating is performed at a temperature in the range of 730 to 1,050° C. in a non-oxidizing atmosphere.

The reducing agent may be at least one selected from the group consisting of magnesium (Mg), calcium (Ca), strontium (Sr), barium (Ba), and any hydride thereof. Among them, calcium (Ca) is particularly useful. The reducing agent is often supplied in the form of granules. The reducing agent is preferably used in the form of granules with a size of 0.5 to 3.0 mm.

The reducing agent (e.g., Ca granules) is added in an amount 1.1 to 10.0 times the equivalent. As used herein, the term "the equivalent" refers to the amount of the reducing agent required to reduce the oxygen component in the raw material mixture, specifically, to reduce oxygen in the rare earth-iron alloy particles and to reduce the rare earth oxide particles. If the reducing agent is added in an amount less than 1.1 times the equivalent, the reduction of the oxide will be insufficient so that the rare earth element (R) will poorly diffuse when generated by the reduction. If the reducing agent is added in an amount more than 10 times the equivalent, a large excess of the reducing agent will remain as an undesirable residue. Such a large amount of the reducing agent residue may hinder the diffusion of the rare earth element (R). Moreover, a large amount of the reducing agent-derived residue will form, and the removal of it will be laborious.

The mixing step preferably includes uniformly mixing the raw material mixture with the reducing agent (e.g., Ca granules). The mixer may be a V-blender, an S-blender, a ribbon mixer, a ball mill, a Henschel mixer, Mechano Fusion, Nobilta, Hybridization System, or Miralo. The mixing is preferably performed so that in particular, the rare earth-iron alloy particles and the rare earth oxide particles (the raw materials) form a uniform mixture without segregation. This is because the segregation of the rare earth oxide particles may cause variations in the thickness of the shell layer.

Next, the mixture of the reducing agent and the raw material mixture is heated to form a reduction-diffusion reaction product. For example, the heating may be performed as described below. The resulting mixture is placed in an iron crucible. The iron crucible is then placed in a reaction vessel. The reaction vessel is then placed in an electric furnace. During the period from the mixing to the placement in the electric furnace, the material is preferably kept as much as possible from coming into contact with air or water vapor. To remove residual air and water vapor from the mixture, it is preferred to evacuate the reaction vessel and replace the air in the reaction vessel by an inert gas, such as helium (He) or argon (Ar).

Subsequently, the mixture is subjected to reduction-diffusion treatment in a non-oxidizing atmosphere either while the reaction vessel is evacuated again or while an inert gas, such as helium (He) or argon (Ar), is allowed to flow through the reaction vessel. It is important to perform the heat treatment at a temperature in the range of 730 to 1050° C. Below 730° C., the formation of the shell layer by the diffusion reaction will poorly proceed on the surface of the rare earth-iron alloy particles (e.g., $R_2Fe_{17}$ particles) although the reducing agent (e.g., Ca granules) will vaporize and reduce the rare earth oxide. In this case, it is difficult to expect that the final magnetic powder product will have improved heat resistance. Above 1,050° C., the magnetic particles will undergo grain growth, aggregation, and sintering to decrease in remanent magnetization and coercive force. The heating temperature is preferably 750 to 1,000° C.

The heating temperature and the heat holding time may be set so that the final magnetic powder product can be obtained while grain growth, aggregation, and sintering are inhibited. For example, the set temperature may be held for 0 to 10 hours. If the holding time is more than 8 hours, grain growth, aggregation, and sintering may occur significantly to make it difficult to obtain a magnetic powder with the target average particle size of 1 μm or more and 10 μm or less. The holding time may be 0 to 8 hours, 0 to 5 hours, or 0 to 3 hours. A holding time of "0 hours" means that cooling is performed immediately after the set temperature is reached.

The heat treatment described above enables the formation of the core including the rare earth-iron alloy having one of the $Th_2Zn_{17}$-type, $Th_2Ni_{17}$-type, and $TbCu_7$-type crystal structures, and enables the formation of the shell layer through the diffusion reaction of the rare earth element (R) resulting from the reduction. The shell layer includes a rare earth element (R) and iron (Fe) in an atomic ratio R/Fe of 0.3 or more and 5.0 or less and has a nitrogen (N) content of more than 0 at % and 10 at % or less. The phosphoric acid-derived compound coating on the rare earth-iron alloy particles allows the phosphorus (P) therein to react with an excess of the rare earth element (R) during the diffusion reaction by heating. This results in precipitation of particles of a compound including the rare earth element (R) and phosphorus (P) (RP compound particles), which are a component of the magnetic powder.

Rare earth-iron-nitrogen-based magnetic particles have a nucleation-type coercivity mechanism. If such particles have a soft magnetic phase, such as α-Fe, or crystal defects, which reduce crystal magnetic anisotropy, on their surface, the soft magnetic phase or the crystal defects may form reverse magnetic domain-generating nuclei (nucleation) to reduce their coercive force. The low heat resistance of the conventional magnetic powder is due to a soft magnetic phase, such as α-Fe or Fe nitride, which is produced by heat-induced decomposition of the $R_2Fe_{17}N_3$ compound phase and forms reverse magnetic domain-generating nuclei. In contrast, according to the embodiment, the shell layer with an atomic ratio R/Fe of 0.3 or more and 5.0 or less formed on the particle surface provides improved heat resistance (oxidation resistance) for the magnetic powder.

This would be because the shell layer is less likely to undergo decomposition by heating than the $R_2Fe_{17}N_3$ compound phase. This will also be advantageously effective, for example, when the heat treatment is performed under two-stage conditions.

Specifically, the heat treatment for the reduction-diffusion may include two stages: the first stage including holding the temperature in the range of 730 to 810° C. for 0.5 to 4 hours; and the second stage including raising the temperature and holding the temperature in the range of 800 to 1,000° C. for 3 hours or less. Under such conditions, the rare earth oxide particles will be sufficiently reduced to the rare earth metal, and the rare earth-iron alloy $R_2Fe_{17}$ will form the core, on the surface of which the rare earth element (R) will undergo an accelerated diffusion reaction to form the shell layer.

The reaction product obtained after the completion of the heat treatment may be a sintered product including: rare earth-iron alloy particles (e.g., $R_2Fe_{17}$ particles) having the shell layer on their surface; metal R; $RFe_3$ compound and/or $RFe_2$ compound; RP compound particles; and reducing agent-derived components. The reducing agent-derived components include particles of an oxide (e.g., CaO) of the reducing agent, which are a by-product, and an unreacted residue of the reducing agent (e.g., Ca).

Disintegration Treatment Step

If necessary, the reduction-diffusion treatment may be followed by a step (disintegration treatment step) that includes subjecting, to disintegration treatment, the product (reduction-diffusion reaction product) resulting from the reduction-diffusion treatment. The reaction product is in the form of sintered lumps. Even when the reaction product is in the form of sintered lumps, the rare earth-iron alloy $R_2Fe_{17}$ particles present inside the reaction product can be nitrided in the subsequent heating and nitriding step since the reaction product have fine pores. The reaction product in the form of lumps, however, may be allowed to disintegrate before the heating and nitriding step, so that the nitriding will proceed more uniformly in the heating and nitriding step. Examples of the disintegration treatment method include, but are not limited to, a method of mechanically disintegrating the reaction product; and a method that includes placing the reaction product in a hydrogen gas atmosphere and allowing the metal R and the $RFe_3$ compound and/or the $RFe_2$ compound to absorb hydrogen so that the reaction product will disintegrate due to its volume expansion caused by the hydrogen absorption.

Heating and Nitriding Step

The heating and nitriding step includes heating and nitriding the product (reduction-diffusion reaction product), which results from the reduction-diffusion treatment or the disintegration treatment, in a gas stream including nitrogen and/or ammonia to form a nitridation reaction product. The heating and nitriding may be performed by a known method, for example, in a nitrogen ($N_2$) gas atmosphere, a nitrogen ($N_2$)-hydrogen ($H_2$) gas mixture atmosphere, an ammonia ($NH_3$) gas atmosphere, an ammonia ($NH_3$)-hydrogen ($H_2$) gas mixture atmosphere, an ammonia ($NH_3$)-nitrogen ($N_2$) gas mixture atmosphere, or an ammonia ($NH_3$)-nitrogen ($N_2$)-hydrogen ($H_2$) gas mixture atmosphere.

The heating and nitriding is performed at a temperature in the range of 300 to 500° C. At a heating temperature of less than 300° C., the nitriding will fail to proceed, which is undesirable. At a heating temperature of more than 500° C., the alloy will undergo decomposition into rare earth nitride and iron, which is undesirable. The heating temperature may be 350° C. or more or 400° C. or more. The heating temperature may be 480° C. or less or 450° C. or less.

The time period for the heating and nitriding may be selected depending on the gas type, the gas flow rate, and the heating temperature. The treatment time period may be increased as the gas flow rate and the heating temperature become small (low). In an ammonia ($NH_3$)-hydrogen (H2) gas mixture atmosphere, for example, the heating and nitriding is preferably performed for 1 to 6 hours, more preferably for 2 to 4 hours. In a nitrogen ($N_2$) gas atmosphere, for example, the heating and nitriding is preferably performed for 10 to 40 hours. In a nitrogen ($N_2$)-hydrogen ($H_2$) gas mixture atmosphere, for example, the heating and nitriding is preferably performed for 5 to 25 hours. After the heating and nitriding, the nitridation reaction product may be cooled and collected. If necessary, the heating and nitriding may be followed by heating the resulting magnetic powder in vacuum or in an inert gas atmosphere, such as an argon gas atmosphere. During such heating, the excessively introduced nitrogen and hydrogen will be discharged from the magnetic powder, so that the core of the magnetic particle will have a more uniform nitrogen distribution. This will also result in an improvement in the squareness of the magnetic hysteresis loop of the magnetic powder.

Wet Treatment Step

If necessary, a wet treatment step may be performed that includes subjecting, to wet treatment, the product resulting from the reduction-diffusion treatment step and/or the heating and nitriding step (the reduction-diffusion reaction product and/or the nitridation reaction product). The wet treatment may include placing the reduction-diffusion reaction product and/or the nitridation reaction product in a washing liquid including water and/or a glycol to allow the product to disintegrate. This step will reduce the content of the reducing agent-derived components (particles of an oxide of the reducing agent, which are a by-product, and an unreacted residue of the reducing agent) in the product. When placed and allowed to stand in the washing liquid (water and/or a glycol) for 0.1 to 24 hours, the product will disintegrate into fine particles to form a slurry. The slurry has a pH of approximately 10 to approximately 12. Placing the product in the washing liquid, stirring the product, and removing the supernatant (decantation) may be repeated until the pH of the slurry reaches 10 or less. Subsequently, if necessary, a weak acid, such as acetic acid, may be added to the slurry so that its pH will be 6 to 7. Thus, a hydroxide (e.g., $Ca(OH)_2$) of the reducing agent component can be dissolved in and removed from the slurry. In a case where the slurry contains additional nitrides derived from metal R, $RFe_3$ compound and/or $RFe_2$ compound, the additional nitrides may also be dissolved and removed by continuing the stirring and washing while adding the acid to maintain the pH at 6 to 7. The residual acid component may then be washed off with water and/or a glycol, which may then be replaced by an alcohol, such as methanol or ethanol. The resulting product may be subjected to solid-liquid separation and drying. The drying may be performed by heating at 100 to 300° C., preferably at 150 to 250° C., in vacuum or in an inert gas atmosphere.

The glycol may be at least one alkylene glycol selected from the group consisting of ethylene glycol, propylene glycol, diethylene glycol, dipropylene glycol, triethylene glycol, and tripropylene glycol. Preferably, one or any mixture of these glycols is used directly. If the viscosity is high to the extent that the reaction product and the reducing agent component in the slurry are difficult to separate and remove, the glycol may be diluted with water before use. It should be noted that the washing liquid preferably has a water content of 50% by mass or less. In this context, the term "water content" refers to the percentage ratio of the mass of water to the total mass of the glycol and water (water/(glycol+water)). A water content of more than 50% by mass may cause significant oxidation of the particles. The water content is more preferably 30% by mass or less, even more preferably 10% by mass or less, most preferably 5% by mass or less. The amount of the glycol to be used may be, but not limited to, 2 to 10 times the equivalent of the glycol required to react with the reducing agent component in the reaction product. Preferably, the glycol is used in an amount 3 to 8 times the mass of the reaction product.

Fine Particle-Forming Step

If necessary, a fine particle-forming step may be performed that includes subjecting the product resulting from the heating and nitriding step and/or the wet treatment step to disintegration treatment to form fine particles. In some cases, the resulting particles have undergone sintering and necking depending on the reduction-diffusion conditions. In a case where the final magnetic powder product is to be used as a material for anisotropic magnets, the particles may be subjected to disintegration treatment, so that necking-induced deterioration of the orientation of the magnetic powder in magnetic field will be prevented. The disintegration treatment may be performed using a dry pulverizer, such as a jet mill, or a wet pulverizer, such as a medium stirring mill. Whatever it is, the pulverizer is preferably operated under weak conditions for breaking only necked portions and maintaining the shell layer while avoiding strong shear conditions or impact crushing conditions.

Coating Formation Step

If necessary, a coating formation step may be performed that includes forming a phosphoric acid-derived compound coating on the surface of the resulting product (particles). Especially in a case where the magnetic powder is for use in applications under high-humidity environments, the phosphoric acid-derived compound coating will provide more stable properties for the powder. What type the phosphoric acid-derived compound coating has and how to form it are known as disclosed in Patent Document 3. In an embodiment, the phosphoric acid-derived compound coating may be formed with a relatively small thickness in consideration of the thickness of the shell layer. The coating with a thickness of more than 20 nm may reduce the magnetization, and thus the coating is preferably approximately 5 nm to approximately 20 nm in thickness.

The magnetic powder according to the embodiment can be produced as described above. The magnetic powder includes a rare earth element (R), iron (Fe), and nitrogen (N) as main constituents, has an average particle size of 1.0 μm or more and 10.0 μm or less, has a rare earth element (R) content of 22.0% by mass or more and 30.0% by mass or less, and has a nitrogen (N) content of 2.5% by mass or more and 4.0% by mass or less. The magnetic powder includes magnetic particles including: a core having a crystal structure selected from the group consisting of $Th_2Zn_{17}$-type, $Th_2Ni_{17}$-type, and $TbCu_7$-type crystal structures; and a shell layer having a thickness of 1 nm or more and 30 nm or less and provided on the surface of the core. The shell layer contains a rare earth element (R) and iron (Fe) in an atomic ratio R/Fe of 0.3 or more and 5.0 or less and has a nitrogen (N) content of more than 0 at % and 10 at % or less. The magnetic powder further contains particles of a compound including a rare earth element (R) and phosphorus (P) (RP compound particles). The magnetic powder has advantages including not only high heat resistance and high weather resistance but also high magnetic properties.

To the knowledge of the inventors, the magnetic powder according to the embodiment or the method for production thereof is not known in the art. For example, Patent Document 2 discloses a method for producing a rare earth-transition metal-nitrogen-based magnetic alloy powder, including the steps of (a) crushing a mother alloy including a rare earth metal (R) and a transition metal (TM) to form a mother alloy powder; and (b) mixing the mother alloy powder with a rare earth oxide powder and a reducing agent and heating the mixture in an inert gas. In contrast to the production method according to the embodiment, the method according to Patent Document 2 does not use any rare earth oxide fine particles with sizes of at most 2.0 μm. Moreover, in the method according to Patent Document 2, only the mother alloy is crushed and then mixed with a rare earth oxide powder. Therefore, the method according to Patent Document 2 cannot form any core-shell structure.

Patent Document 3 discloses a process that includes crushing rare earth-iron-nitrogen-based coarse magnetic particles in an organic solvent containing phosphoric acid to form a phosphate coating. In this process, however, the targets on which the phosphate coating is to be formed are not rare earth-iron alloy particles for use as a raw material but magnetic particles resulting from nitriding treatment. Therefore, the production method according to the embodiment is clearly distinguishable from the process according to Patent Document 3. Moreover, the process according to Patent Document 3 does not use any rare earth oxide fine particles with sizes of at most 2.0 μm. Therefore, the process according to Patent Document 3 cannot form any core-shell structure.

Patent Document 4 discloses a rare earth bonded magnet comprising a resin and anisotropic rare earth alloy-based magnetic particles having a surface coating metal layer, in which the metal in the surface coating metal layer is at least one elemental metal selected from the group consisting of Zn, Sn, In, Al, Si, and rare earth elements, or an alloy thereof (see claims 1 and 2 of Patent Document 4). Patent Document 4, however, does not disclose or suggest any surface coating metal layer containing a rare earth element (R) and iron (Fe) in an atomic ratio R/Fe of 0.3 or more and 5.0 or less and containing nitrogen (N), and the surface coating metal layer disclosed in Patent Document 4 is completely different from the shell layer according to the embodiment.

Compound for Forming Bonded Magnet

The compound according to an embodiment for forming a bonded magnet includes the rare earth-iron-nitrogen-based magnetic powder described above and a resin binder. The compound may be produced by mixing the magnetic powder and the resin binder. The magnetic powder may be mixed with the resin binder being melted and kneaded in a mixer, such as a Banbury mixer, a kneader, a roll mixer, a kneader-ruder, a single screw extruder, or a twin screw extruder.

The resin binder may be either a thermoplastic resin or a thermosetting resin. The thermoplastic resin binder may be any type. Examples of the thermoplastic resin include polyamide resin, such as nylon 6, nylon 6-6, nylon 11, nylon 12, nylon 6-12, aromatic nylon, or modified nylon obtained by partially modifying any of these molecules or copolymerizing these molecules, linear polyphenylene sulfide resin, cross-linked polyphenylene sulfide resin, semi-crosslinked polyphenylene sulfide resin, low density polyethylene, linear low density polyethylene resin, high density polyethylene resin, ultra-high molecular weight polyethylene resin, polypropylene resin, ethylene-vinyl acetate copolymer resin, ethylene-ethyl acrylate copolymer resin, ionomer resin, polymethyl pentene resin, polystyrene resin, acrylonitrile-butadiene-styrene copolymer resin, acrylonitrile-styrene copolymer resin, polyvinyl chloride resin, polyvinylidene chloride resin, polyvinyl acetate resin, polyvinyl alcohol resin, polyvinyl butyral resin, polyvinyl formal resin, methacrylic resin, polyvinylidene fluoride resin, polyethylene trifluoride chloride resin, tetrafluoroethylene-hexafluoropropylene copolymer resin, ethylene-tetrafluoroethylene copolymer resin, tetrafluoroethylene-perfluoroalkyl vinyl ether copolymer resin, polytetrafluoroethylene resin, polycarbonate resin, polyacetal resin, polyethylene terephthalate resin, polybutylene terephthalate resin, polyphenylene oxide resin, polyallyl ether allyl sulfone resin, polyethersulfone resin, polyetheretherketone resin, polyarylate resin, aromatic polyester resin, cellulose acetate resin, and elastomers based on any of the above resins. Examples also include homopolymers of these types, and random, block, and graft copolymers of these types with other monomers, and modifications thereof with terminal groups modified with other materials. Examples of the thermosetting resin include unsaturated polyester resin and epoxy resin.

Among them, nylon 12, modified nylon 12, nylon elastomers, and polyphenylene sulfide resin are preferred in view of various properties of the resulting molded products and the ease of the method of producing them. Any blend of two or more of these thermoplastic resins may also be used.

In an embodiment, the heat resistance of the magnetic powder used as a raw material is higher than that of the conventional $Sm_2Fe_{17}N_3$ magnetic powder, and the magnetic properties of the magnetic powder used as a raw material are comparable to or higher than those of a highly heat-resistant $R_2(Fe,M)_{17}N_x$ (M=Cr or Mn) magnetic powder. The magnetic powder has high heat resistance, and therefore, it can be subjected to high-temperature molding with a highly heat-resistant thermoplastic resin binder, such as a polyphenylene sulfide resin or aromatic polyamide resin binder. This is advantageously effective in preparing high-performance bonded magnets with high heat resistance.

The amount of the resin binder in the compound is preferably, but not limited to, 1 to 50 parts by mass based on 100 parts by mass of the compound. If the amount of the resin binder is less than 1 part by mass, a significant increase in mixing torque or a reduction in fluidity may occur to make it difficult to perform molding, and insufficient magnetic properties may be provided. If the amount of the binder resin is more than 50 parts by mass, desired magnetic properties may fail to be obtained. The amount of the resin binder in the compound may be 3 to 50 parts by mass, 5 to 30 parts by mass, or 7 to 20 parts by mass.

The compound may contain additives, such as a reactive diluent, an unreactive diluent, a thickener, a lubricant, a mold release agent, a UV absorber, a flame retardant, and various stabilizers, and a filler as long as the object of the embodiment is not compromised. Depending on the desired magnetic properties, the compound may further contain an additional magnetic powder in addition to the magnetic powder according to the embodiment. Such an additional magnetic powder may be a material for use in common bonded magnets, such as a rare earth magnetic powder, a ferrite magnetic powder, or an alnico magnetic powder. The compound may contain not only an anisotropic magnetic powder but also an isotropic magnetic powder. Such a magnetic powder preferably has an anisotropic magnetic field $H_A$ of 4.0 MA/m (50 kOe) or more.

Bonded Magnet

The bonded magnet according to an embodiment includes the rare earth-iron-nitrogen-based magnetic powder described above and a resin binder. The bonded magnet may be produced by injection molding, extrusion molding, or compression molding of the compound described above. In particular, injection molding is preferred. The types and proportions of the components in the bonded magnet may be the same as those in the compound used to form the bonded magnet.

The compound used to form the bonded magnet may be injection-molded under conditions with a maximum thermal history temperature of 330° C. or less, preferably 310° C. or less, more preferably 300° C. or less. A maximum thermal history temperature of more than 330° C. may deteriorate the magnetic properties. It should be noted, however, that the bonded magnet according to the embodiment has higher magnetic properties than the product including the conventional magnetic powder with no shell layer.

The magnetic powder in the compound used to form the boded magnet may be anisotropic. In such a case, a magnetic circuit may be incorporated in the die of the molding machine to apply an orienting magnetic field to the space (mold cavity) for molding the compound so that an anisotropic bonded magnet can be produced. In this case, an orienting magnetic field of 400 kA/m or more, preferably 800 kA/m or more may be applied, so that the resulting bonded magnet will have high magnetic properties. The magnetic powder in the compound used to form the boded magnet may be isotropic. In such a case, the compound may be molded with no orienting magnetic field applied to the molding space (mold cavity).

The bonded magnet according to the embodiment is very useful for a wide range of fields including automobiles, general home electrical appliances, communication and audio equipment, medical equipment, and general industrial equipment. The magnetic powder according to the embodiment has high heat resistance and high magnetic properties and thus can be subjected to compression molding and sintering to form magnets. This makes it possible to produce high-performance, binder-free magnets with less deterioration of coercivity.

EXAMPLES

The present invention will be described in more detail with reference to the examples below. It should be noted that the examples below are not intended to limit the present invention.
(1) Evaluation
Various properties of produced rare earth-iron-nitrogen-based magnetic powders were evaluated as shown below.
Powder Particle Size The powder was observed with a scanning electron microscope (SEM) to evaluate its particle size. During the observation of the powder, an SEM reflection electron image was taken at a magnification of approximately 1,000×, in which the component particles were each identified based on the contrast difference and their long axis diameters were determined to be their sizes. A laser diffraction particle size distribution analyzer (HELOS & RODOS, Nippon Laser Corporation) was also used to determine the particle size ($D_{50}$) at 50% in the particle volume distribution, which was determined to be the average particle size.
Weight Loss on Heating In vacuum, 50 g of the powder was heated at 400° C. for 5 hours. The weight loss (a) on heating was determined by comparing the mass of the powder before and after the heating. Specifically, the weight loss (a) on heating was determined as the ratio: (the mass before the heating−the mass after the heating)/the mass before the heating.

Magnetic Properties

The magnetic properties (remanent magnetization $\sigma_r$ and coercive force $H_c$) of the powder were measured using a vibrating sample magnetometer. The measurement was performed according to Bonded Magnet Test Method Guidebook BMG-2005 (The Japan Association of Bonded Magnetic Materials). First, approximately 20 mg of the powder sample was placed together with paraffin in a transparent acrylic case 2 mm in inner diameter and 7 mm in length. Under a magnetic field of 1.6 MA/m applied in the longitudinal direction, the paraffin was melted by heating the case with a dryer. After the particles were oriented, the paraffin was cooled and solidified to form a measurement sample. The sample was magnetized in a magnetic field of 3.2 MA/m.
Heat Resistance The heat resistance of the powder was evaluated by comparing the coercive force ($H_c$) of the powder before and after heating. The heating was performed at 300° C. for 90 minutes in an argon (Ar) atmosphere at atmospheric pressure. The coercive force ($H_c$) before the heating and the coercive force ($H_{c,300}$) after the heating were measured and used to calculate the rate ($H_{c,300}/H_c$) of coercive force retention.
Crystal Structure of Powder The crystal structure of the powder was evaluated by powder X-ray diffraction (XRD). The X-ray diffraction measurement was performed using a Cu target at an acceleration voltage of 45 kV, a current of 40 mA, and a 2θ scanning speed of 2 min/deg. The resulting X-ray diffraction (XRD) pattern was then analyzed to identify the crystal structure.
Analysis of Composition and Thickness of Shell Layer The composition and the average thickness of the shell layer were analyzed and evaluated using a transmission electron microscope (TEM) (JEM-ARM200F (JEOL Ltd.) at an acceleration voltage of 200 kV) and an energy dispersive X-ray spectroscopy (EDS) detector (Thermo Fisher Scientific, NSS). Before the analysis, the powder was embedded in a thermosetting resin, and the resulting product was processed using a focused ion beam system to form a thin observation sample with a 100 nm-thick cross-section. The resulting sample was used for the analysis and evaluation.
Composition of Magnetic Powder The proportions (contents) of rare earth (R) and nitrogen (N) in the magnetic powder were determined by inductively coupled plasma (ICP) emission spectroscopy and thermal conductivity technique, respectively.
(2) Production of Rare Earth-Iron-Nitrogen-Based Magnetic Powders As shown in Examples 1 to 9 and Comparative Examples 1 to 10, rare earth-iron-nitrogen-based magnetic powders were produced and evaluated for their properties. Tables 1 and 2 show the conditions for the production of the magnetic powders and their properties.

Example 1

Preparation Step

A $Sm_2Fe_{17}$ alloy powder was provided as a rare earth-iron alloy powder, and a samarium oxide ($Sm_2O_3$) powder was provided as a rare earth oxide powder. The $Sm_2Fe_{17}$ alloy powder (rare earth-iron alloy powder) was produced according to the procedure shown below.

Provided were a samarium oxide ($Sm_2O_3$) powder with an average particle size ($D_{50}$) of 2.3 μm, an iron (Fe) powder with an average particle size ($D_{50}$) of 40 μm, and calcium (Ca) metal granules. Subsequently, 0.44 kg of the samarium oxide powder, 1.0 kg of the iron powder, and 0.23 kg of the calcium metal granules were mixed in a mixer. The resulting mixture was placed in an iron crucible and heated at 1,150° C. for 8 hours in an argon (Ar) gas atmosphere to form a reaction product.

The reaction product was taken out after cooling, then added to 2 L of water, and allowed to stand in an argon (Ar) gas atmosphere for 12 hours to form a slurry. After the supernatant of the slurry was discarded, 2 L of water was newly added to the slurry and stirred. After the Sm—Fe alloy particles settled, the resulting supernatant containing suspended calcium hydroxide was discarded. The process of adding water, stirring the mixture, and removing the supernatant was repeated until the pH reached below 11. Subsequently, while the alloy particles and 2 L of water were stirred, acetic acid was added to the slurry until the pH reached 6. After the resulting mixture was allowed to stand with stirring for 30 minutes, the supernatant was discarded. The process of adding 2 L of water again, stirring the mixture, and discarding the supernatant was repeated 5 times. Finally, the water in the slurry was replaced by alcohol, and then the alloy particles were collected using a Nutsche filter. The collected alloy particles were placed in a mixer and stirred and dried at 100° C. for 10 hours under reduced pressure to give 1.3 kg of a $Sm_2Fe_{17}$ alloy powder (rare earth-iron alloy powder). The resulting $Sm_2Fe_{17}$ alloy powder had an average particle size of 30 μm.

The composition of the resulting rare earth-iron alloy powder was 24.5% by mass samarium (Sm), 0.15% by mass oxygen (O), 0.54% by mass hydrogen (H), and less than 0.01% by mass calcium (Ca), with the remainder being iron (Fe). The main phase of the alloy powder was $Sm_2Fe_{17}$ having $Th_2Zn_{17}$-type crystal structure.

Mixing Step

In a rocking mixer, 1 kg of the $Sm_2Fe_{17}$ alloy powder (rare earth-iron alloy powder) resulting from the preparation step was pre-mixed with 100 g of the samarium oxide powder (rare earth oxide powder). The samarium oxide powder used had an average particle size ($D_{50}$) of 2.3 μm. Ten parts by mass of the samarium oxide was mixed with 100 parts by mass of the $Sm_2Fe_{17}$ alloy powder. A mixed solution of 2.2 kg of isopropyl alcohol and 23.1 g of 85% phosphoric acid was used as a solvent. The resulting premixture was ground with the solvent in a medium stirring mill to form a slurry.

The resulting slurry was placed in a mixer, heated under reduced pressure to evaporate the solvent, and then cooled to room temperature. Subsequently, while stirring was continued in the mixer, nitrogen gas having 4 vol % oxygen was allowed to flow through the mixer, and the oxygen concentration was gradually increased to 10 vol % with careful attention not to heat the mixture powder to above 40° C. due to heat generation by oxidation. After the completion of heat generation was confirmed, the crushed mixture was collected. The collected crushed mixture was placed in an electric furnace and heated up to 210° C. in vacuum. As a result, a decrease in the degree of vacuum due to gas emission was observed. After the gas emission was over and the degree of vacuum returned to the initial level, the crushed mixture (raw material mixture) was cooled and then taken out.

The observation of the SEM reflection electron image of the crushed mixture showed that the $Sm_2Fe_{17}$ alloy particles ($Sm_2Fe_{17}$ fine powder) had a maximum particle size of 10 μm and that the samarium oxide particles ($Sm_2O_3$ fine powder) had a maximum particle size of 1.0 μm. The composition of the crushed mixture was 28.8% by mass samarium (Sm), 0.54% by mass phosphorus (P), 3.7% by mass oxygen (O), and 0.41% by mass hydrogen (H), with the remainder being iron (Fe). The mixture had an average particle size ($D_{50}$) of 1.2 μm as a whole. TEM observation of the FIB-processed cross-section showed the formation of a phosphoric acid-derived compound coating including Sm, Fe, P, and O on the surfaces of the $Sm_2Fe_{17}$ alloy particles. The coating had a thickness of 5 to 10 nm. The crushed mixture had a weight loss (a) on heating of 0.4% by mass.

Reduction-Diffusion Treatment Step

The resulting crushed mixture was subjected to reduction-diffusion treatment. First, 46.6 g of a reducing agent was added to and mixed with 200 g of the crushed mixture. The reducing agent used was calcium (Ca) metal granules sieved between 1.0 mm and 2.0 mm. The reducing agent was mixed in an amount 2.5 times the amount (equivalent) required to reduce the crushed mixture, which was calculated from the oxygen content of the crushed mixture. Next, the resulting mixture was placed in an iron crucible, heated in an argon (Ar) gas atmosphere, held at 930° C. for 2 hours, and then cooled. This yielded a reaction product (reduction-diffusion reaction product).

Disintegration Treatment Step

The collected reaction product was placed in a tubular furnace, and the air in the furnace was replaced by argon (Ar) gas. Subsequently, the reaction product was heated to 150° C. in a hydrogen ($H_2$) gas stream at a flow rate of 1 L/minute, held at 150° C. for 30 minutes, and then cooled. This yielded a disintegrated reaction product.

Heating and Nitriding Step

In a nitrogen ($N_2$) gas stream at a flow rate of 200 cc/minute, the disintegrated reaction product was heated, held at 450° C. for 24 hours, and then cooled. This yielded a nitridation reaction product.

Wet Treatment Step

The collected nitridation reaction product was subjected to wet treatment. First, 20 g of the nitridation reaction product was placed in 200 cc of ion-exchanged water. Subsequently, the mixture was allowed to stand for 1 hour in an argon (Ar) gas atmosphere to form a slurry, and then the supernatant of the slurry was discarded. Subsequently, 200 cc of ion-exchanged water was newly added to the slurry, and the mixture was stirred for 1 minute. The mixture was allowed to stand until the alloy nitride particles settled, which was followed by discarding the supernatant containing suspended calcium components. The process of adding ion-exchanged water and removing the supernatant was repeated 15 times. Next, 100 cc of isopropyl alcohol was added to the slurry and stirred, and the mixture was subjected to filtration with a Nutsche filter. The resulting cake was placed in a static dryer and dried at 150° C. for 1 hour in vacuum. This yielded a rare earth-iron-nitrogen-based magnetic powder.

Figure 2:
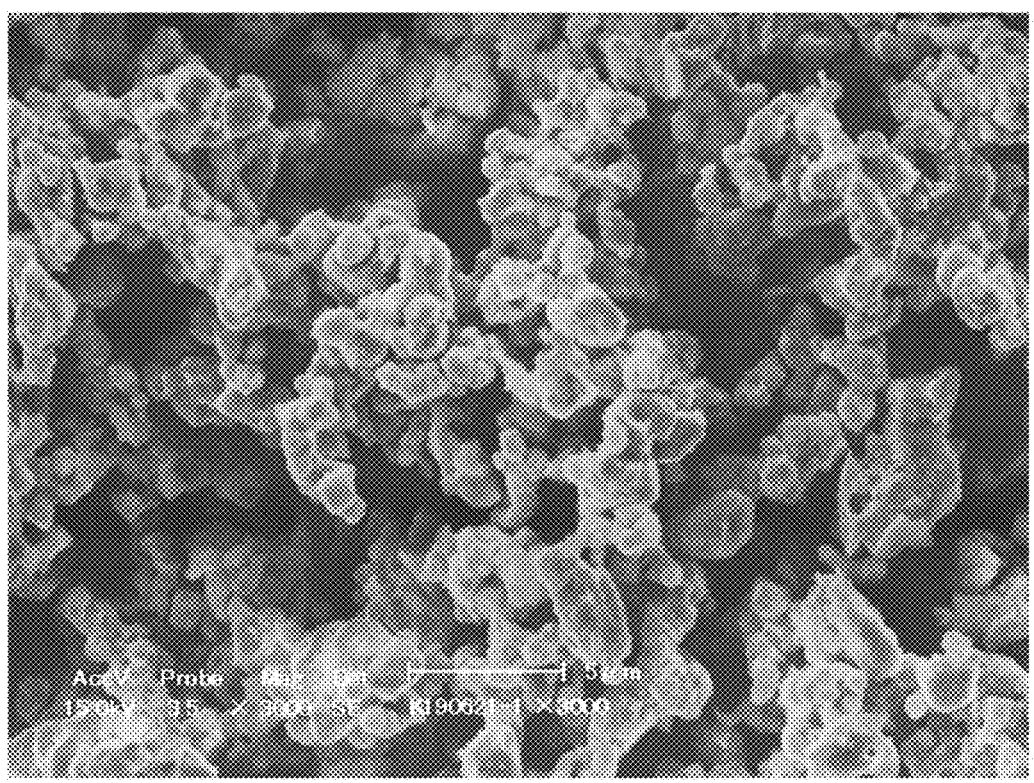
FIG. 2 is a photograph showing a scanning electron microscopy (SEM) secondary electron image of a magnetic powder.

The resulting rare earth-iron-nitrogen-based magnetic powder was analyzed by XRD method and found to have a $Th_2Zn_{17}$-type crystal structure. The XRD profile also showed $Sm_2Fe_{17}N_3$ peaks ($Th_2Zn_{17}$-type crystal structure) and SmP phase peaks. As measured with a laser diffraction particle size distribution meter, the powder had an average particle size ($D_{50}$) of 3.6 μm. The observation of the SEM secondary electron image of the powder showed aggregation of spherical particles ranging in size from several hundred nm to 5 μm as shown in FIG. 2.

The composition of the magnetic powder was 27.1% by mass Sm, 3.0% by mass N, and 0.26% by mass P as shown in Table 2. The magnetic powder had the following magnetic properties: remanent magnetization ($\sigma_r$) 101 $Am^2/kg$; and coercive force ($H_c$) 1,006 kA/m. Regarding the heat resistance of the magnetic powder, the coercive force ($H_{c,300}$) of the magnetic powder after the heating was 922 kA/m, and the rate ($H_{c,300}/H_c$) of coercive force retention was 92%.

Figure 3:
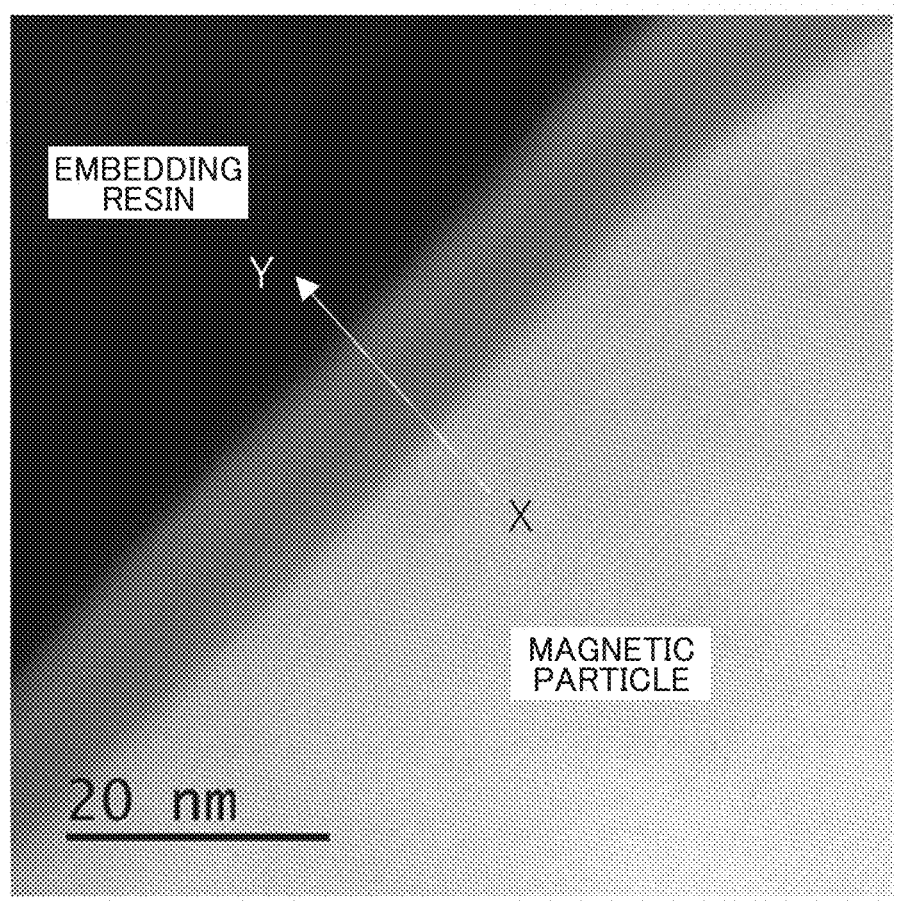
FIG. 3 is a photograph showing a high-angle annular dark-field transmission electron microscopy (HAADF-TEM) image of a magnetic powder.
Figure 4:
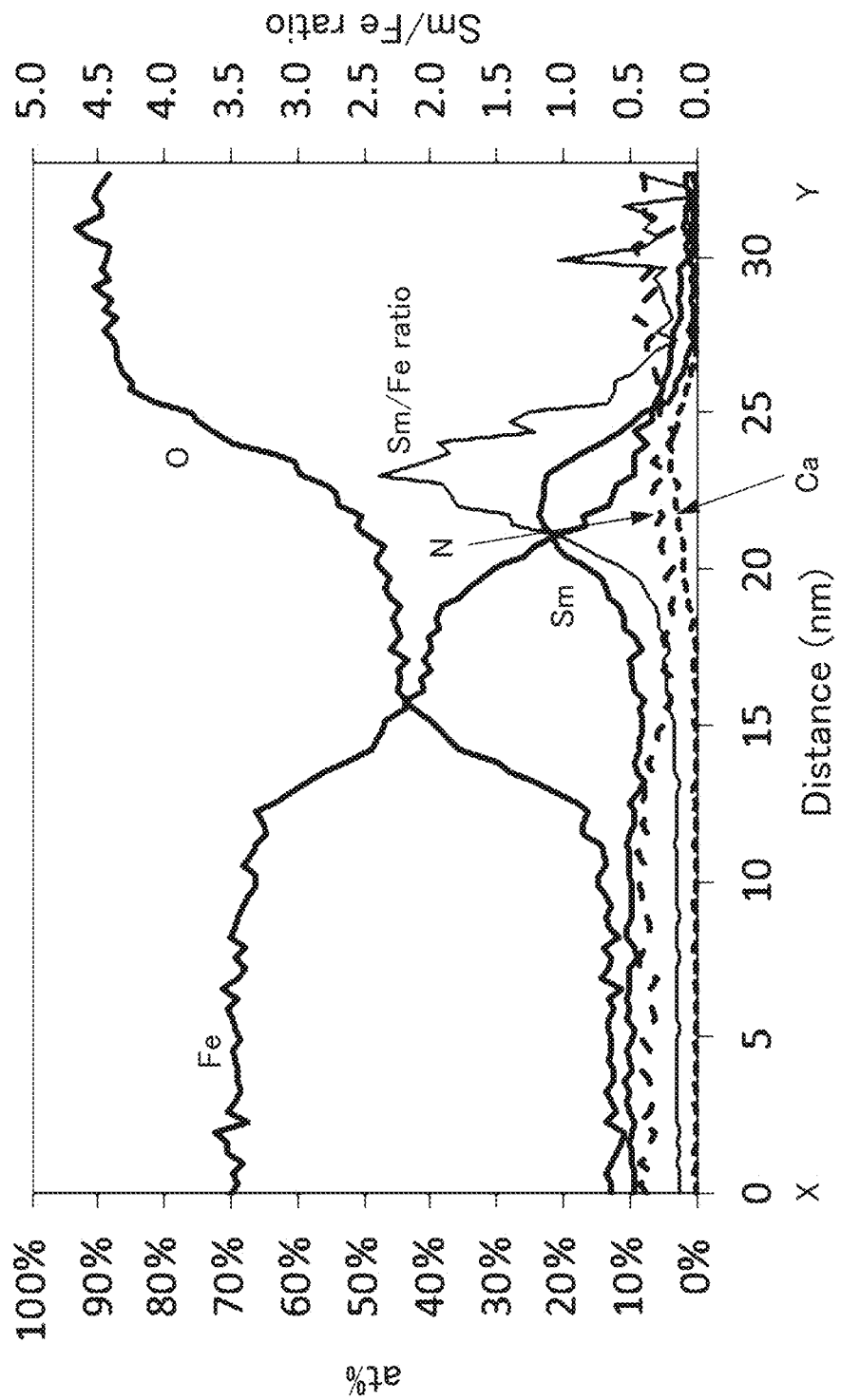
FIG. 4 is a graph showing a line profile resulting from energy dispersive X-ray spectroscopy (EDS) surface analysis of a magnetic powder.

The surfaces of particles in the resulting magnetic powder were observed by TEM. Before the observation, the magnetic powder was embedded in a thermosetting resin, and the resulting product was processed to form a thin sample. The cross-section of the thin sample was observed. FIG. 3 is a high-angle annular dark-field (HAADF) image of the surface of the magnetic particle, and FIG. 4 is a graph showing a line profile resulting from energy dispersive X-ray spectroscopy (EDS) surface analysis in the thickness direction. FIG. 4 shows a line profile resulting from EDS analysis of the composition, which is along the line from point X to point Y in FIG. 3. In FIG. 4, the left and right ends of the horizontal axis respectively correspond to points X and Y in FIG. 3. In FIG. 4, the total content of Sm, Fe, N, Ca, O, and P is normalized to 100 at %.

FIG. 3 shows that the resulting magnetic particle had a shell layer with a thickness of approximately 10 nm at its surface. Focusing on the contract of the HAADF image indicated that the shell layer consisted of a bright outer layer and a dark inner layer. The outer layer was approximately 4 nm thick, and the inner layer was approximately 6 nm thick. FIG. 4 also shows that the outer layer had a Sm/Fe ratio (A) of up to 2.5. $Sm_2Fe_{17}N_3$, which was the main phase of the core, had a Sm/Fe ratio of approximately 0.12. Thus, the outer layer was found to be Sm-rich. The outer layer also contained up to 7 at % of N and contained O and Ca. The inner layer, which was close to the main phase, had a Sm/Fe ratio (B) of approximately 0.2. Thus, the inner layer was found to be Sm-rich as compared to the main phase. The inner layer contained up to 5 at % of N and contained O, but was free of Ca. The Sm/Fe ratio (A) of the outer layer and the Sm/Fe ratio (B) of the inner layer satisfied the relation A>B.

Example 2

A rare earth-iron-nitrogen-based magnetic powder was produced as in Example 1 except that the reduction-diffusion treatment, the disintegration treatment, the heating and nitriding, and the wet treatment were performed as explained in the following.

Reduction-Diffusion Treatment Step

First, 46.6 g of a reducing agent was added to and mixed with 200 g of the crushed mixture (raw material mixture) produced in Example 1. The reducing agent used was calcium (Ca) metal granules sieved between 1.0 mm and 2.0 mm. The reducing agent was mixed in an amount 2.5 times the amount required to reduce the crushed mixture, which was calculated from the oxygen content of the crushed mixture. Next, the resulting mixture was placed in an iron crucible, heated in an argon (Ar) gas atmosphere, held at 900° C. for 2 hours, and then cooled. This yielded a reduction-diffusion reaction product.

Disintegration Treatment Step

The collected reaction product was placed in a tubular furnace, and the air in the furnace was replaced by argon (Ar) gas. Subsequently, the reaction product was heated to 300° C. in a hydrogen ($H_2$) gas stream at a flow rate of 1 L/minute, held at 300° C. for 30 minutes, and then cooled. This yielded a disintegrated reaction product.

Heating and Nitriding Step

In a nitrogen ($N_2$) gas stream at a flow rate of 200 cc/minute, the disintegrated reaction product was heated, held at 450° C. for 24 hours, and then cooled. This yielded a nitridation reaction product.

Wet Treatment Step

Ten g of the collected nitridation reaction product was placed in 100 cc of ion-exchanged water. Subsequently, the mixture was allowed to stand for 2 hours in an argon (Ar) gas atmosphere to form a slurry, and then the supernatant of the slurry was discarded. Subsequently, 100 cc of ion-exchanged water was newly added to the slurry, and the mixture was stirred for 1 minute. The mixture was allowed to stand until the alloy nitride particles settled, which was followed by discarding the supernatant containing suspended calcium components. The process of adding ion-exchanged water and removing the supernatant was repeated 15 times. Next, 50 cc of isopropyl alcohol was added to the slurry and stirred, and the mixture was subjected to filtration with a Nutsche filter. The resulting cake was placed in a static dryer and dried at 150° C. for 1 hour in vacuum. This yielded a rare earth-iron-nitrogen-based magnetic powder.

Figure 5:
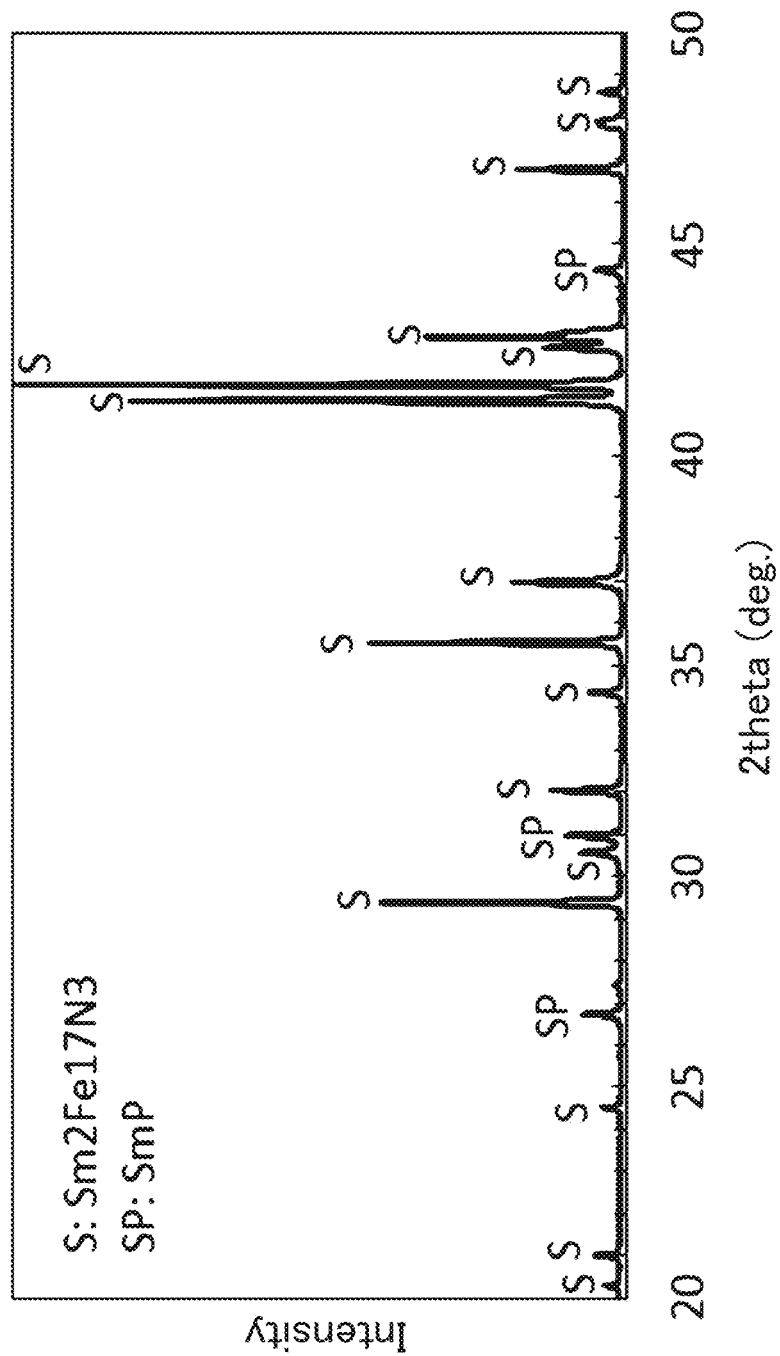
FIG. 5 is a graph showing an X-ray diffraction (XRD) pattern of a magnetic powder.
Figure 6:
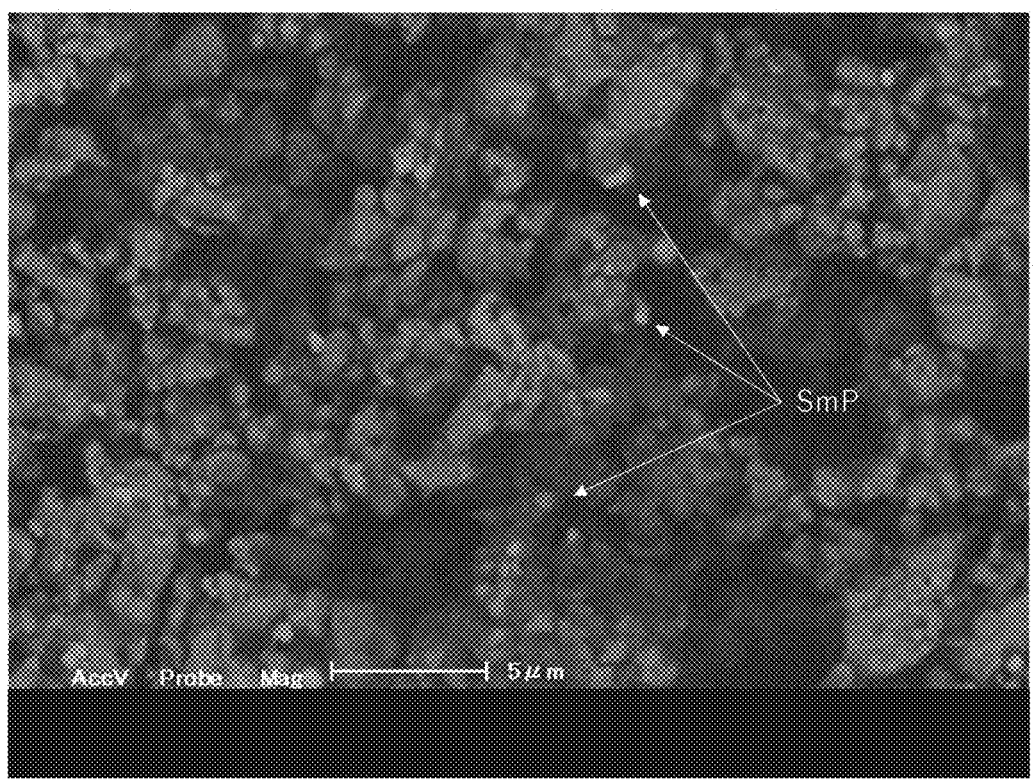
FIG. 6 is a photograph showing an SEM reflection electron image of a magnetic powder.

The resulting rare earth-iron-nitrogen-based magnetic powder was analyzed by XRD method and found to have a $Th_2Zn_{17}$-type crystal structure as shown in FIG. 5. As measured with a laser diffraction particle size distribution meter, the powder had an average particle size ($D_{50}$) of 3.3 μm. The observation of the SEM reflection electron image of the powder showed aggregation of spherical particles ranging in size from several hundred nm to 4 μm as shown in FIG. 6.

As shown in FIG. 5, the resulting XRD profile showed $Sm_2Fe_{17}N_3$ peaks ($Th_2Zn_{17}$-type crystal structure) and SmP phase peaks. Rietveld analysis showed that the content of the SmP phase was 3.3% by mass. Particles several hundred nm to 2 μm in size shown with a bright contrast in FIG. 6 corresponded to the SmP phase.

The composition of the magnetic powder was 27.5% by mass Sm, 3.1% by mass N, and 0.27% by mass P as shown in Table 2. The magnetic powder had the following magnetic properties: remanent magnetization 102 $Am^2/kg$; and coercive force 1,123 kA/m. Regarding the heat resistance of the magnetic powder, the coercive force ($H_{c,300}$) of the magnetic powder after the heating was 851 kA/m, and the rate ($H_{c,300}/H_c$) of coercive force retention was 76%. TEM observation of the particle surface, which was performed as in Example 1, showed the presence of a 2 nm-thick shell layer. The shell layer had a Sm/Fe ratio of up to 0.5 and had a N content of up to 3 at %. The shell layer was found to consist of: an outer layer including Sm, Fe, N, O, and Ca; and an inner layer including Sm, Fe, N, and O and being free of Ca. The Sm/Fe ratio (A) of the outer layer and the Sm/Fe ratio (B) of the inner layer satisfied the relation A>B.

Example 3

A rare earth-iron-nitrogen-based magnetic powder was produced as in Example 1 except that the wet treatment was performed as explained in the following.

Wet Treatment Step

Twenty g of the nitridation reaction product produced in Example 1 was placed in 1 L of an ethylene glycol aqueous solution with a water content of 20% by mass, which was defined as the ratio: water/(ethylene glycol+water). Subsequently, the mixture was stirred for 3 hours in an argon (Ar) gas atmosphere to form a slurry, and then the supernatant of the slurry was discarded. Subsequently, 1 L of an ethylene glycol aqueous solution with a water content of 20% by mass was newly added to the slurry, and the mixture was stirred for 5 minutes. The mixture was allowed to stand until the alloy nitride particles settled, which was followed by discarding the supernatant containing suspended calcium components. The process of adding the ethylene glycol solution and removing the supernatant was repeated 3 times in an argon (Ar) gas atmosphere. Next, 500 cc of dehydrated ethanol was added to the slurry and stirred, and the mixture was allowed to stand until the alloy nitride particles settled, which was followed by discarding the supernatant. The process of adding dehydrated ethanol and removing the supernatant was repeated 3 times in an argon (Ar) gas atmosphere. Finally, the mixture was subjected to filtration with a Nutsche filter, and the resulting cake was placed in a mixer and dried with stirring at 150° C. for 1 hour in vacuum. This yielded a rare earth-iron-nitrogen-based magnetic powder.

The resulting rare earth-iron-nitrogen-based magnetic powder was analyzed by XRD method and found to have a $Th_2Zn_{17}$-type crystal structure. The resulting XRD profile showed $Sm_2Fe_{17}N_3$ peaks ($Th_2Zn_{17}$-type crystal structure) and SmP phase peaks. As measured with a laser diffraction particle size distribution meter, the powder had an average particle size ($D_{50}$) of 4.4 μm. SEM observation showed aggregation of spherical particles ranging in size from several hundred nm to 5 μm as in Example 1. TEM observation of the particle surface showed the presence of a 10 nm-thick shell layer having a two-layer structure. The shell layer had a Sm/Fe ratio of up to 2.1 and had a N content of up to 5 at %. The shell layer was found to consist of: an outer layer including Sm, Fe, N, O, and Ca; and an inner layer including Sm, Fe, N, and O and being free of Ca. The Sm/Fe ratio (A) of the outer layer and the Sm/Fe ratio (B) of the inner layer satisfied the relation A>B.

Example 4

A rare earth-iron-nitrogen-based magnetic powder was produced as in Example 1 except that the wet treatment was performed as explained in the following.
Wet Treatment Step The nitridation reaction product produced in Example 1 was placed in 1 L of ethylene glycol, and the mixture was stirred for 3 hours in an argon (Ar) gas atmosphere to form a slurry. After the supernatant of the slurry was discarded, 1 L of ethylene glycol was newly added to the slurry, and the mixture was stirred for 10 minutes. The mixture was allowed to stand until the alloy nitride particles settled, which was followed by discarding the supernatant containing suspended calcium components. The process of adding ethylene glycol and removing the supernatant was repeated 10 times in an argon (Ar) gas atmosphere. Next, 500 cc of dehydrated ethanol was added to the slurry and stirred, and the mixture was allowed to stand until the alloy nitride particles settled, which was followed by discarding the supernatant. The process of adding dehydrated ethanol and removing the supernatant was repeated 5 times in an argon (Ar) gas atmosphere. Finally, the mixture was subjected to filtration with a Nutsche filter in an argon (Ar) atmosphere, and the resulting cake was placed in a mixer and dried with stirring at 150° C. for 1 hour in vacuum. This yielded a rare earth-iron-nitrogen-based magnetic powder.

The resulting rare earth-iron-nitrogen-based magnetic powder was analyzed by XRD method and found to have a $Th_2Zn_{17}$-type crystal structure. The resulting XRD profile showed $Sm_2Fe_{17}N_3$ peaks ($Th_2Zn_{17}$-type crystal structure) and SmP phase peaks. As measured with a laser diffraction particle size distribution meter, the powder had an average particle size ($D_{50}$) of 4.8 μm. SEM observation showed aggregation of spherical particles ranging in size from several hundred nm to 5 μm as in Example 1. TEM observation of the particle surface showed the presence of a 22 nm-thick shell layer having a two-layer structure. The shell layer had a Sm/Fe ratio of up to 3.7 and had a N content of up to 9 at %. The shell layer was found to consist of: an outer layer including Sm, Fe, N, O, and Ca; and an inner layer including Sm, Fe, N, and O and being free of Ca. The Sm/Fe ratio (A) of the outer layer and the Sm/Fe ratio (B) of the inner layer satisfied the relation A>B.

Example 5

A rare earth-iron-nitrogen-based magnetic powder was produced as in Example 1 except that the mixing and the reduction-diffusion treatment were performed as explained in the following.
Mixing Step The mixing was performed as in Example 1 except that the time period for which crushing was performed in the medium stirring mill to form the crushed mixture was modified. In the crushed mixture, the $Sm_2Fe_{17}$ alloy particles had a maximum particle size of 7 μm, and the samarium oxide particles had a maximum particle size of 0.6 μm. The composition of the crushed mixture was 28.6% by mass Sm, 0.57% by mass P, 4.7% by mass O, and 0.48% by mass H, with the remainder being Fe. The mixture had an average particle size ($D_{50}$) of 1.1 μm as a whole. A 5 to 10 nm-thick phosphoric acid-derived compound coating was deposited on the surfaces of the $Sm_2Fe_{17}$ alloy particles. The crushed mixture had a weight loss (α) on heating of 0.8% by mass.
Reduction-Diffusion Treatment First, 70.6 g of a reducing agent was added to and mixed with 200 g of the resulting crushed mixture. The reducing agent used was calcium (Ca) metal granules sieved between 1.0 mm and 2.0 mm. The reducing agent was mixed in an amount 3.0 times the amount required to reduce the crushed mixture, which was calculated from the oxygen content of the crushed mixture. Next, the resulting mixture was placed in an iron crucible, heated in an argon (Ar) gas atmosphere, held at 730° C. for 10 hours, and then cooled. This yielded a reaction product (reduction-diffusion reaction product).

The resulting reaction product was subjected to the heating and nitriding and the wet treatment as in Example 1 to form a magnetic powder.

The resulting rare earth-iron-nitrogen-based magnetic powder was analyzed by XRD method and found to have a $Th_2Zn_{17}$-type crystal structure. The resulting XRD profile showed $Sm_2Fe_{17}N_3$ peaks ($Th_2Zn_{17}$-type crystal structure) and SmP phase peaks. As measured with a laser diffraction particle size distribution meter, the powder had an average particle size ($D_{50}$) of 2.8 μm. SEM observation showed aggregation of spherical particles ranging in size from several ten nm to 3 μm as in Example 1. TEM observation of the particle surface showed the presence of a 6 nm-thick shell layer having a two-layer structure. The shell layer had a Sm/Fe ratio of up to 1.8 and had a N content of up to 6 at %. The shell layer was found to consist of: an outer layer including Sm, Fe, N, O, and Ca; and an inner layer including Sm, Fe, N, and O and being free of Ca. The Sm/Fe ratio (A) of the outer layer and the Sm/Fe ratio (B) of the inner layer satisfied the relation A>B.

Example 6

A rare earth-iron-nitrogen-based magnetic powder was produced as in Example 1 except that the mixing, the reduction-diffusion treatment, the disintegration treatment, and the heating and nitriding were performed as explained in the following.

Mixing Step

The mixing was performed as in Example 1 except that the time period for which crushing was performed in the medium stirring mill to form the crushed mixture was modified. In the crushed mixture, the $Sm_2Fe_{17}$ alloy particles had a maximum particle size of 15 μm, and the samarium oxide particles had a maximum particle size of 1.8 μm. The composition of the crushed mixture was 29.1% by mass Sm, 0.52% by mass P, 2.5% by mass O, and 0.28% by mass H, with the remainder being Fe. The mixture had an average particle size ($D_{50}$) of 2.7 μm as a whole. A 5 to 10 nm-thick phosphoric acid-derived compound coating was deposited on the surfaces of the $Sm_2Fe_{17}$ alloy particles. The crushed mixture had a weight loss (α) on heating of 0.2% by mass.

Reduction-Diffusion Treatment

First, 122.7 g of a reducing agent was added to and mixed with 200 g of the resulting crushed mixture. The reducing agent used was calcium (Ca) metal granules sieved between 1.0 mm and 2.0 mm. The reducing agent was mixed in an amount 9.8 times the amount required to reduce the crushed mixture, which was calculated from the oxygen content of the crushed mixture. Next, the resulting mixture was placed in an iron crucible, heated in an argon (Ar) gas atmosphere, held at 860° C. for 4 hours, and then cooled. This yielded a reaction product (reduction-diffusion reaction product).

Disintegration Treatment Step

The collected reaction product was placed in a tubular furnace, and the air in the furnace was replaced by argon (Ar) gas. Subsequently, the reaction product was heated to 150° C. in a hydrogen ($H_2$) gas stream at a flow rate of 1 L/minute, held at 150° C. for 30 minutes, and then cooled. This yielded a disintegrated reaction product.

Heating and Nitriding Step

In a stream of a mixture of ammonia ($NH_3$) gas at a flow rate of 50 cc/minute and hydrogen ($H_2$) gas at a flow rate of 100 cc/minute, the disintegrated reaction product was heated, held at 420° C. for 2 hours, and then cooled. This yielded a nitridation reaction product.

The resulting nitridation reaction product was subjected to the wet treatment as in Example 1 to form a magnetic powder.

The resulting rare earth-iron-nitrogen-based magnetic powder was analyzed by XRD method and found to have a $Th_2Zn_{17}$-type crystal structure. The resulting XRD profile showed $Sm_2Fe_{17}N_3$ peaks ($Th_2Zn_{17}$-type crystal structure) and SmP phase peaks. As measured with a laser diffraction particle size distribution meter, the powder had an average particle size ($D_{50}$) of 9.1 μm. SEM observation showed aggregation of spherical particles ranging in size from several hundred nm to 4 μm as in Example 1. TEM observation of the particle surface showed the presence of an 8 nm-thick shell layer having a two-layer structure. The shell layer had a Sm/Fe ratio of up to 2.9 and had a N content of up to 7 at %. The shell layer was found to consist of: an outer layer including Sm, Fe, N, O, and Ca; and an inner layer including Sm, Fe, N, and O and being free of Ca. The Sm/Fe ratio (A) of the outer layer and the Sm/Fe ratio (B) of the inner layer satisfied the relation A>B.

Example 7

A rare earth-iron-nitrogen-based magnetic powder was produced as in Example 1 except that the mixing, the reduction-diffusion treatment, the disintegration treatment, and the heating and nitriding were performed as explained in the following.

Mixing Step

The mixing was performed as in Example 1 except that the time period for which crushing was performed in the medium stirring mill to form the crushed mixture was modified. In the crushed mixture, the $Sm_2Fe_{17}$ alloy particles had a maximum particle size of 3 μm, and the samarium oxide particles had a maximum particle size of 0.2 μm. The composition of the crushed mixture was 27.5% by mass Sm, 0.61% by mass P, 6.2% by mass O, and 0.51% by mass H, with the remainder being Fe. The mixture had an average particle size ($D_{50}$) of 1.1 μm as a whole. A 5 to 10 nm-thick phosphoric acid-derived compound coating was deposited on the surfaces of the $Sm_2Fe_{17}$ alloy particles. The crushed mixture had a weight loss (α) on heating of 0.9% by mass.

Reduction-Diffusion Treatment

First, 217.4 g of a reducing agent was added to and mixed with 200 g of the resulting crushed mixture. The reducing agent used was calcium (Ca) metal granules sieved between 1.0 mm and 2.0 mm. The reducing agent was mixed in an amount 7.0 times the amount required to reduce the crushed mixture, which was calculated from the oxygen content of the crushed mixture. Next, the resulting mixture was placed in an iron crucible, heated in an argon (Ar) gas atmosphere, held at 1,050° C. for 0.5 hours, and then cooled. This yielded a reaction product (reduction-diffusion reaction product).

Disintegration Treatment Step

The collected reaction product was placed in a tubular furnace, and the air in the furnace was replaced by argon (Ar) gas. Subsequently, the reaction product was heated to 150° C. in a hydrogen ($H_2$) gas stream at a flow rate of 1 L/minute, held at 150° C. for 30 minutes, and then cooled. This yielded a disintegrated reaction product.

Heating and Nitriding Step

In a stream of a mixture of ammonia ($NH_3$) gas at a flow rate of 50 cc/minute and hydrogen ($H_2$) gas at a flow rate of 100 cc/minute, the disintegrated reaction product was heated, held at 430° C. for 2 hours, and then cooled. This yielded a nitridation reaction product.

The resulting nitridation reaction product was subjected to the wet treatment as in Example 1 to form a magnetic powder.

The resulting rare earth-iron-nitrogen-based magnetic powder was analyzed by XRD method and found to have a $Th_2Zn_{17}$-type crystal structure. The resulting XRD profile showed $Sm_2Fe_{17}N_3$ peaks ($Th_2Zn_{17}$-type crystal structure) and SmP phase peaks. As measured with a laser diffraction particle size distribution meter, the powder had an average particle size ($D_{50}$) of 4.2 μm. SEM observation showed aggregation of spherical particles ranging in size from several hundred nm to 5 μm as in Example 1. TEM observation of the particle surface showed the presence of a 14 nm-thick shell layer having a two-layer structure. The shell layer had a Sm/Fe ratio of up to 4.5 and had a N content of up to 8 at %. The shell layer was found to consist of: an outer layer including Sm, Fe, N, O, and Ca; and an inner layer including Sm, Fe, N, and O and being free of Ca. The Sm/Fe ratio (A) of the outer layer and the Sm/Fe ratio (B) of the inner layer satisfied the relation A>B.

Example 8

A rare earth-iron-nitrogen-based magnetic powder was produced as in Example 1 except that the mixing, the reduction-diffusion treatment, the disintegration treatment, and the heating and nitriding were performed as explained in the following.

Mixing Step

The mixing was performed as in Example 1 except that 200 g of samarium oxide was mixed to form the crushed mixture; the time period for which crushing was performed in the medium stirring was modified; and the amount of samarium oxide mixed corresponded to 20 parts by mass based on 100 parts by mass of the $Sm_2Fe_{17}$ alloy powder. In the crushed mixture, the $Sm_2Fe_{17}$ alloy particles had a maximum particle size of 12 μm, and the samarium oxide particles had a maximum particle size of 1.1 μm. The composition of the crushed mixture was 33.8% by mass Sm, 0.52% by mass P, 3.5% by mass O, and 0.38% by mass H, with the remainder being Fe. The mixture had an average particle size ($D_{50}$) of 1.7 μm as a whole. A 5 to 10 nm-thick phosphoric acid-derived compound coating was deposited on the surfaces of the $Sm_2Fe_{17}$ alloy particles. The crushed mixture had a weight loss (α) on heating of 0.5% by mass.

Reduction-Diffusion Treatment Step

First, 31.6 g of a reducing agent was added to and mixed with 200 g of the resulting crushed mixture. The reducing agent used was calcium (Ca) metal granules sieved between 1.0 mm and 2.0 mm. The reducing agent was mixed in an amount 1.8 times the amount required to reduce the crushed mixture, which was calculated from the oxygen content of the crushed mixture. Next, the resulting mixture was placed in an iron crucible, heated in an argon (Ar) gas atmosphere, held at 820° C. for 3 hours, and then cooled. This yielded a reaction product (reduction-diffusion reaction product).

Disintegration Treatment Step

The collected reaction product was placed in a tubular furnace, and the air in the furnace was replaced by argon (Ar) gas. Subsequently, the reaction product was heated to 150° C. in a hydrogen ($H_2$) gas stream at a flow rate of 1 L/minute, held at 150° C. for 30 minutes, and then cooled. This yielded a disintegrated reaction product.

Heating and Nitriding Step

In a nitrogen ($N_2$) gas stream at a flow rate of 200 cc/minute, the disintegrated reaction product was heated, held at 450° C. for 24 hours, and then cooled. This yielded a nitridation reaction product.

The resulting nitridation reaction product was subjected to the wet treatment as in Example 1 to form a magnetic powder.

The resulting rare earth-iron-nitrogen-based magnetic powder was analyzed by XRD method and found to have a $Th_2Zn_{17}$-type crystal structure. The resulting XRD profile showed $Sm_2Fe_{17}N_3$ peaks ($Th_2Zn_{17}$-type crystal structure) and SmP phase peaks. As measured with a laser diffraction particle size distribution meter, the powder had an average particle size ($D_{50}$) of 5.2 μm. SEM observation showed aggregation of spherical particles ranging in size from several hundred nm to 5 μm as in Example 1. TEM observation of the particle surface showed the presence of a 17 nm-thick shell layer having a two-layer structure. The shell layer had a Sm/Fe ratio of up to 4.9 and had a N content of up to 10 at %. The shell layer was found to consist of: an outer layer including Sm, Fe, N, O, and Ca; and an inner layer including Sm, Fe, N, and O and being free of Ca. The Sm/Fe ratio (A) of the outer layer and the Sm/Fe ratio (B) of the inner layer satisfied the relation A>B.

Example 9

A rare earth-iron-nitrogen-based magnetic powder was produced as in Example 1 except that the mixing, the reduction-diffusion treatment, the disintegration treatment, and the heating and nitriding were performed as explained in the following.

Mixing Step

The mixing was performed as in Example 1 except that 10 g of samarium oxide was mixed to form the crushed mixture; the time period for which crushing was performed in the medium stirring was modified; and the amount of samarium oxide mixed corresponded to 1 part by mass based on 100 parts by mass of the $Sm_2Fe_{17}$ alloy powder. In the crushed mixture, the $Sm_2Fe_{17}$ alloy particles had a maximum particle size of 4 μm, and the samarium oxide particles had a maximum particle size of 0.3 μm. The composition of the crushed mixture was 23.8% by mass Sm, 0.43% by mass P, 5.8% by mass O, and 0.29% by mass H, with the remainder being Fe. The mixture had an average particle size ($D_{50}$) of 1.3 μm as a whole. A 5 to 10 nm-thick phosphoric acid-derived compound coating was deposited on the surfaces of the $Sm_2Fe_{17}$ alloy particles. The crushed mixture had a weight loss (α) on heating of 0.3% by mass.

Reduction-Diffusion Treatment Step

First, 34.9 g of a reducing agent was added to and mixed with 200 g of the resulting crushed mixture. The reducing agent used was calcium (Ca) metal granules sieved between 1.0 mm and 2.0 mm. The reducing agent was mixed in an amount 1.2 times the amount required to reduce the crushed mixture, which was calculated from the oxygen content of the crushed mixture. Next, the resulting mixture was placed in an iron crucible, heated in an argon (Ar) gas atmosphere, held at 1,000° C. for 1 hour, and then cooled. This yielded a reaction product (reduction-diffusion reaction product).

Disintegration Treatment Step

The collected reaction product was placed in a tubular furnace, and the air in the furnace was replaced by argon (Ar) gas. Subsequently, the reaction product was heated to 150° C. in a hydrogen ($H_2$) gas stream at a flow rate of 1 L/minute, held at 150° C. for 30 minutes, and then cooled. This yielded a disintegrated reaction product.

Heating and Nitriding Step

In a nitrogen ($N_2$) gas stream at a flow rate of 200 cc/minute, the disintegrated reaction product was heated, held at 470° C. for 20 hours, and then cooled. This yielded a nitridation reaction product.

The resulting nitridation reaction product was subjected to the wet treatment as in Example 1 to form a magnetic powder.

The resulting rare earth-iron-nitrogen-based magnetic powder was analyzed by XRD method and found to have a $Th_2Zn_{17}$-type crystal structure. The resulting XRD profile showed $Sm_2Fe_{17}N_3$ peaks ($Th_2Zn_{17}$-type crystal structure) and SmP phase peaks. As measured with a laser diffraction particle size distribution meter, the powder had an average particle size ($D_{50}$) of 3.7 μm. SEM observation showed aggregation of spherical particles ranging in size from several hundred nm to 7 μm as in Example 1. TEM observation of the particle surface showed the presence of a 5 nm-thick shell layer having a two-layer structure. The shell layer had a Sm/Fe ratio of up to 1.3 and had a N content of up to 6 at %. The shell layer was found to consist of: an outer layer including Sm, Fe, N, O, and Ca; and an inner layer including Sm, Fe, N, and O and being free of Ca. The Sm/Fe ratio (A) of the outer layer and the Sm/Fe ratio (B) of the inner layer satisfied the relation A>B.

Comparative Example 1

A magnetic power was produced as in Example 1 except that the reduction-diffusion treatment was performed at 710° C. for 2 hours.

The resulting rare earth-iron-nitrogen-based magnetic powder was analyzed by XRD method and found to have a $Th_2Zn_{17}$-type crystal structure. Unfortunately, α-Fe diffraction lines were also observed in addition to that. TEM observation of the particle surface showed no shell layer.

Comparative Example 2

A magnetic powder was produced as in Example 1 except that the reduction-diffusion treatment was performed at 1,100° C. for 1 hour; the heating and nitriding was performed using a mixture of ammonia ($NH_3$) gas at a flow rate of 50 cc/minute and hydrogen ($H_2$) gas at a flow rate of 100 cc/minute; and the nitriding time was 3 hours.

The resulting rare earth-iron-nitrogen-based magnetic powder was analyzed by XRD method and found to have a $Th_2Zn_{17}$-type crystal structure. SEM/EDS analysis showed the presence of a coarse $SmFe_3$ phase among the particles. As measured with a laser diffraction particle size distribution meter, the powder had an average particle size ($D_{50}$) of 10.4 μm. TEM observation of the particle surface showed no shell layer.

Comparative Example 3

A magnetic powder was produced as in Example 1 except that the amount of samarium oxide mixed to form the crushed mixture was increased to 220 g (corresponding to 22 parts by mass based on 100 parts by mass of the $Sm_2Fe_{17}$ alloy powder); the amount of calcium (Ca) metal granules (reducing agent) mixed for the reduction-diffusion treatment was changed to 64.5 g (3.3 times the amount required for the reduction and calculated from the oxygen content of the crushed mixture); the heating and nitriding was performed using a mixture of ammonia ($NH_3$) gas at a flow rate of 50 cc/minute and hydrogen ($H_2$) gas at a flow rate of 100 cc/minute; and the nitriding time was 3 hours.

The observation of the SEM reflection electron image of the crushed mixture showed that the $Sm_2Fe_{17}$ alloy particles had a maximum particle size of 12 μm and that the samarium oxide particles had a maximum particle size of 1.4 μm. The composition of the crushed mixture was 32.2% by mass Sm, 0.52% by mass P, 3.9% by mass O, and 0.02% by mass H, with the remainder being Fe. The mixture had an average particle size ($D_{50}$) of 2.5 μm as a whole. The crushed mixture had a weight loss (α) on heating of 0.7% by mass.

The resulting rare earth-iron-nitrogen-based magnetic powder was analyzed by XRD method and found to have a $Th_2Zn_{17}$-type crystal structure. As measured with a laser diffraction particle size distribution meter, the powder had an average particle size ($D_{50}$) of 3.3 μm. SEM observation showed aggregation of spherical particles ranging in size from several hundred nm to 8 μm. SEM observation also showed a large amount of $SmFe_3$ nitride phase in addition to SmP particles. TEM observation of the particle surface showed the presence of a shell layer. The shell layer had a thickness of 32 nm, a Sm/Fe ratio of up to 5.3, and a N content of up to 16 at %.

Comparative Example 4

A magnetic powder was produced as in Example 1 except that the amount of samarium oxide mixed to form the crushed mixture was decreased to 9 g (corresponding to 0.9 parts by mass based on 100 parts by mass of the $Sm_2Fe_{17}$ alloy powder); and the amount of calcium (Ca) metal granules (reducing agent) mixed for the reduction-diffusion treatment was changed to 36.1 g (3.0 times the amount required for the reduction and calculated from the oxygen content of the crushed mixture).

The observation of the SEM reflection electron image of the crushed mixture showed that the $Sm_2Fe_{17}$ alloy particles had a maximum particle size of 9 μm and that the samarium oxide particles had a maximum particle size of 0.7 μm. The composition of the crushed mixture was 24.4% by mass Sm, 0.51% by mass P, 2.4% by mass O, and 0.01% by mass H, with the remainder being Fe. The mixture had an average particle size ($D_{50}$) of 2.1 μm as a whole. The crushed mixture had a weight loss (α) on heating of 0.3% by mass.

The resulting rare earth-iron-nitrogen-based magnetic powder was analyzed by XRD method and found to have a $Th_2Zn_{17}$-type crystal structure. Unfortunately, strong α-Fe diffraction lines were also observed in addition to that. As measured with a laser diffraction particle size distribution meter, the powder had an average particle size ($D_{50}$) of 4.6 μm. SEM observation showed aggregation of spherical particles ranging in size from several hundred nm to 7 μm. TEM observation of the particle surface showed no shell layer.

Comparative Example 5

A magnetic power was produced as in Example 1 except that the heating and nitriding was performed at 290° C. for 24 hours.

The resulting rare earth-iron-nitrogen-based magnetic powder was analyzed by XRD method and found to have a $Th_2Zn_{17}$-type crystal structure. As measured with a laser diffraction particle size distribution meter, the powder had an average particle size ($D_{50}$) of 4.8 μm. SEM observation showed aggregation of spherical particles ranging in size from several hundred nm to 7 μm. TEM observation of the particle surface showed the presence of a shell layer having a two-layer structure in which, however, the content of N was at the background level.

Comparative Example 6

A magnetic powder was produced as in Example 1 except that the heating and nitriding was performed at 510° C. for 3 hours using a mixture of ammonia ($NH_3$) gas at a flow rate of 50 cc/minute and hydrogen ($H_2$) gas at a flow rate of 100 cc/minute.

The resulting rare earth-iron-nitrogen-based magnetic powder was analyzed by XRD method and found to have a $Th_2Zn_{17}$-type crystal structure. Unfortunately, strong α-Fe diffraction lines were also observed in addition to that. As measured with a laser diffraction particle size distribution meter, the powder had an average particle size ($D_{50}$) of 3.1 μm. SEM observation showed aggregation of spherical particles ranging in size from several hundred nm to 6 μm. TEM observation of the surface of particles in the powder showed the presence of a shell layer having a two-layer structure in which, however, the content of N was up to 14 at %.

Comparative Example 7

A magnetic powder was produced as in Example 1 except that the time period for which crushing was performed in the medium stirring mill to form the crushed mixture was modified; and the amount of calcium (Ca) metal granules (reducing agent) mixed for the reduction-diffusion treatment was changed to 38.8 g (2.5 times the amount required for the reduction and calculated from the oxygen content of the crushed mixture).

In the crushed mixture, the $Sm_2Fe_{17}$ alloy particles had a maximum particle size of 18 μm, and the samarium oxide particles had a maximum particle size of 2.8 μm. The composition of the crushed mixture was 29.0% by mass Sm, 0.55% by mass P, 3.1% by mass O, and 0.009% by mass H, with the remainder being Fe. The mixture had an average particle size ($D_{50}$) of 3.7 μm as a whole. The crushed mixture had a weight loss (α) on heating of 0.05% by mass.

The resulting rare earth-iron-nitrogen-based magnetic powder was analyzed by XRD method and found to have a $Th_2Zn_{17}$-type crystal structure. As measured with a laser diffraction particle size distribution meter, the powder had an average particle size ($D_{50}$) of 8.1 μm. SEM observation showed aggregation of spherical particles ranging in size from 1 μm to 10 μm. TEM observation of the particle surface showed the presence of the shell layer in some areas and the absence of the shell layer in other areas. This indicated uneven formation of the shell layer.

Comparative Example 8

A magnetic powder was produced as in Example 1 except that the amount of calcium (Ca) metal granules (reducing agent) mixed for the reduction-diffusion treatment was changed to 18.5 g (1.0 time the amount required for the reduction and calculated from the oxygen content of the crushed mixture).

The resulting rare earth-iron-nitrogen-based magnetic powder was analyzed by XRD method and found to have a $Th_2Zn_{17}$-type crystal structure. Unfortunately, strong α-Fe diffraction lines were also observed in addition to that. As measured with a laser diffraction particle size distribution meter, the powder had an average particle size ($D_{50}$) of 7.3 μm. SEM observation showed aggregation of spherical particles ranging in size from several hundred nm to 8 μm. TEM observation of the particle surface showed no shell layer.

Comparative Example 9

A magnetic powder was produced as in Example 1 except that the amount of calcium (Ca) metal granules (reducing agent) mixed for the reduction-diffusion treatment was changed to 202.1 g (10.9 times the amount required for the reduction and calculated from the oxygen content of the crushed mixture).

The resulting rare earth-iron-nitrogen-based magnetic powder was analyzed by XRD method and found to have a $Th_2Zn_{17}$-type crystal structure. Unfortunately, strong α-Fe diffraction lines were also observed in addition to that. As measured with a laser diffraction particle size distribution meter, the powder had an average particle size ($D_{50}$) of 9.2 μm. SEM observation showed aggregation of spherical particles ranging in size from several hundred nm to 10 μm. TEM observation of the particle surface showed no shell layer.

Comparative Example 10

A commercially available $Sm_2Fe_{17}N_3$ magnetic powder (SFN Alloy Fine Powder B manufactured by Sumitomo Metal Mining Co., Ltd.) was provided and evaluated for its properties. As a result of evaluation of its heat resistance, it had a coercive force ($H_c$) of 844 kA/m before the heating, a coercive force ($H_{c,300}$) of 407 kA/m after the heating, and a rate ($H_{c,300}/H_c$) of coercive force retention of 48%.

TABLE 1

Conditions for Production of Rare Earth-Iron-Nitrogen-Based Magnetic Powders

| | Mixing step (crushed mixture) | | | | | Reduction-diffusion treatment step | | | | | | Wet treatment step |
|---|---|---|---|---|---|---|---|---|---|---|---|---|
| | $Sm_2Fe_{17}$ fine powder | | $Sm_2O_3$ fine powder | | | Amount of mixed calcium | | | | Heating and nitriding step | | |
| | Mass (g) | Maximum particle size (μm) | Mass (g) | Maximum particle size (μm) | Oxygen content (mass %) | Mass (g) | Equivalent (eq.) | Temperature (°C) | Time (h) | Temperature (°C) | Time (h) | Gas | Washing liquid |
| Example 1 | 1000 | 10 | 100 | 1.0 | 3.7 | 46.6 | 2.5 | 930 | 2 | 450 | 24 | $N_2$ | W |
| Example 2 | 1000 | 10 | 100 | 1.0 | 3.7 | 46.6 | 2.5 | 900 | 2 | 450 | 24 | $N_2$ | W |
| Example 3 | 1000 | 10 | 100 | 1.0 | 3.7 | 46.6 | 2.5 | 930 | 2 | 450 | 24 | $N_2$ | EG + W |
| Example 4 | 1000 | 10 | 100 | 1.0 | 3.7 | 46.6 | 2.5 | 930 | 2 | 450 | 24 | $N_2$ | EG |
| Example 5 | 1000 | 7 | 100 | 0.6 | 4.7 | 70.6 | 3.0 | 730 | 10 | 450 | 24 | $N_2$ | W |
| Example 6 | 1000 | 15 | 100 | 1.8 | 2.5 | 122.7 | 9.8 | 860 | 4 | 420 | 2 | $NH_3 + H_2$ | W |
| Example 7 | 1000 | 3 | 100 | 0.2 | 6.2 | 217.4 | 7.0 | 1050 | 0.5 | 430 | 2 | $NH_3 + H_2$ | W |
| Example 8 | 1000 | 12 | 200 | 1.1 | 3.5 | 31.6 | 1.8 | 820 | 3 | 450 | 24 | $N_2$ | W |
| Example 9 | 1000 | 4 | 10 | 0.3 | 5.8 | 34.9 | 1.2 | 1000 | 1 | 470 | 20 | $N_2$ | W |
| Comparative Example 1 | 1000 | 10 | 100 | 1.0 | 3.7 | 46.6 | 2.5 | 710 | 2 | 450 | 24 | $N_2$ | W |
| Comparative Example 2 | 1000 | 10 | 100 | 1.0 | 3.7 | 46.6 | 2.5 | 1100 | 1 | 450 | 3 | $NH_3 + H_2$ | W |
| Comparative Example 3 | 1000 | 12 | 220 | 1.4 | 3.9 | 64.5 | 3.3 | 930 | 2 | 450 | 3 | $NH_3 + H_2$ | W |
| Comparative Example 4 | 1000 | 9 | 9 | 0.7 | 2.4 | 36.1 | 3.0 | 930 | 2 | 450 | 24 | $N_2$ | W |
| Comparative Example 5 | 1000 | 10 | 100 | 1.0 | 3.7 | 46.6 | 2.5 | 930 | 2 | 290 | 24 | $N_2$ | W |

TABLE 1-continued

Conditions for Production of Rare Earth-Iron-Nitrogen-Based Magnetic Powders

| | Mixing step (crushed mixture) | | | | | Reduction-diffusion treatment step | | | | Heating and nitriding step | | | Wet treatment step |
|---|---|---|---|---|---|---|---|---|---|---|---|---|---|
| | $Sm_2Fe_{17}$ fine powder | | $Sm_2O_3$ fine powder | | | Amount of mixed calcium | | | | | | | |
| | Maximum particle | | Maximum particle | | | | | | | | | | |
| | Mass (g) | size (μm) | Mass (g) | size (μm) | Oxygen content (mass %) | Mass (g) | Equivalent (eq.) | Temperature (° C.) | Time (h) | Temperature (° C.) | Time (h) | Gas | Washing liquid |
| Comparative Example 6 | 1000 | 10 | 100 | 1.0 | 3.7 | 46.6 | 2.5 | 930 | 2 | 510 | 3 | $NH_3 + H_2$ | W |
| Comparative Example 7 | 1000 | 18 | 100 | 2.8 | 3.1 | 38.8 | 2.5 | 930 | 2 | 450 | 24 | $N_2$ | W |
| Comparative Example 8 | 1000 | 10 | 100 | 1.0 | 3.7 | 18.5 | 1.0 | 930 | 2 | 450 | 24 | $N_2$ | W |
| Comparative Example 9 | 1000 | 10 | 100 | 1.0 | 3.7 | 202.1 | 10.9 | 930 | 2 | 450 | 24 | $N_2$ | W |
| Comparative Example 10 | SFN Alloy Fine Powder B (Sumitomo Metal Mining Co., Ltd.) | | | | | | | | | | | | |

Note 1:
"W" neons ion-exchanged water.
Note 2:
*EG" means ethylene glycol.

(3) Evaluation Results

The rare earth-iron-nitrogen-based magnetic powders of Examples 1 to 12 consisted mainly of samarium (Sm), iron (Fe), and nitrogen (N) and had a samarium (Sm) content of 23.2 to 29.9% by mass and a nitrogen (N) content of 2.8 to 3.9% by mass. These magnetic powders had a $Th_2Zn_{17}$-type crystal structure and an average particle size of 2.8 to 9.1 μm. These magnetic powders had an atomic ratio Sm/Fe of 0.5 to 4.9, a nitrogen (N) content of 3 to 10 at %, and a 2 to 22 nm-thick shell layer at their particle surface. These magnetic powders had a remanent magnetization ($\sigma_r$) of at least 90 $Am^2/kg$, a coercive force ($H_c$) of at least 754 kA/m, and a rate ($H_{c,300}/H_c$) of coercive force retention of at least 71%. These magnetic powders exhibited high heat resistance.

In contrast, the magnetic powder of Comparative Example 1 had no shell layer and had a rate of coercive force retention of 43% (lower than 70%) as a result of the heat resistance test. This is because the reduction-diffusion temperature 710° C. was lower than 730° C. during the process. The magnetic powder of Comparative Example 2 had an average particle size of 10.4 μm (more than 10 μm), a coercive force as low as 420 kA/m, and a rate of coercive force retention of 55% (lower than 70%). This is because the reduction-diffusion temperature 1,100° C. was higher than 1,050° C. during the process.

The magnetic powder of Comparative Example 3 had a samarium content of 32.2% by mass (more than 30% by mass) and a nitrogen content of 5.2% by mass (more than 4.0% by mass). This is because the amount of samarium oxide mixed during the process corresponded to 22 parts by mass (more than 20 parts by mass) based on 100 parts by mass of the $Sm_2Fe_{17}$ alloy powder. Moreover, a large amount of a nitride of $SmFe_3$ phase was observed in the magnetic powder of Comparative Example 3. Thus, the magnetic powder of Comparative Example 3 had a shell layer with a thickness of 32 nm (more than 30 nm), an atomic ratio Sm/Fe of 5.3 (more than 5.0), and a remanent magnetization as low as 50 $Am^2/kg$. The magnetic powder of Comparative Example 4 had a samarium content of 21.9% by mass (less than 22% by mass). This is because the amount of samarium oxide mixed during the process corresponded to 0.9 parts by mass (less than 1 part by mass) based on 100 parts by mass of the $Sm_2Fe_{17}$ alloy powder. Thus, the magnetic powder of Example 4 had no shell layer and had a remanent magnetization as low as 43 $Am^2/kg$ and a coercive force as low as 283 kA/m.

The magnetic powder of Comparative Example 5 had a nitrogen content of 1.7% by mass (lower than 2.5% by mass). This is because the nitriding temperature was 290° C. (lower than 300° C.) during the process. Although the magnetic powder of Comparative Example 5 had a shell layer, the nitrogen content of the shell layer was at the background level for the TEM/EDS detector. Thus, the magnetic powder of Comparative Example 5 had a remanent magnetization as low as 39 $Am^2/kg$ and a coercive force as low as 109 kA/m. The magnetic powder of Comparative Example 6 had a nitrogen content of 5.3% by mass (more than 4.0% by mass), a remanent magnetization as low as 48 $Am^2/kg$, and a coercive force as low as 227 kA/m. This is because the nitriding temperature was 510° C. (higher than 500° C.) during the process.

The magnetic powder of Comparative Example 7 was produced using raw materials including: a $Sm_2Fe_{17}$ alloy powder with a maximum particle size of 18 μm (more than 15 μm); and a samarium oxide powder with a maximum particle size of 2.8 μm (more than 2 μm). Thus, the observation of the magnetic powder of Comparative Example 7 showed some particles with a shell layer and other particles with no shell layer and showed uneven formation of the shell layer. This may be because the raw material powders each with a coarse particle size would have caused samarium to unevenly infiltrate into the raw materials when samarium was produced by the reduction during the reduction-diffusion step. Thus, the magnetic powder of Comparative Example 7 had a remanent magnetization as low as 77

Am$^2$/kg and a coercive force as low as 491 kA/m. The magnetic powder of Comparative Example 7 had a rate of coercive force retention of 47% (lower than 70%) and had low heat resistance.

The magnetic powder of Comparative Example 10 (a conventional commercially available Sm$_2$Fe$_{17}$N$_3$ magnetic powder) had a rate of coercive force retention of 48% (lower than 70%).

TABLE 2

Properties of Rare Earth-Iron-Nitrogen-Based Magnetic Powders

| | Core-shell particles | | | | | | | | Shell layer | | |
|---|---|---|---|---|---|---|---|---|---|---|---|
| | Average particle size (μm) | Sm (mass %) | N (mass %) | P (mass %) | σr (Am$^2$/kg) | Hc (kA/m) | Hc, 300 (kA/m) | Hc, 300/Hc (%) | Thickness (nm) | Sm/Fe (Atomic ratio) | N (at %) |
| Example 1 | 3.6 | 27.1 | 3.0 | 0.26 | 101 | 1006 | 922 | 92 | 10 | 2.5 | 7 |
| Example 2 | 3.3 | 27.5 | 3.1 | 0.27 | 102 | 1123 | 851 | 76 | 2 | 0.5 | 3 |
| Example 3 | 4.4 | 27.8 | 3.1 | 0.25 | 100 | 1070 | 990 | 93 | 10 | 2.1 | 5 |
| Example 4 | 4.8 | 28.1 | 3.1 | 0.28 | 105 | 1058 | 1007 | 95 | 22 | 3.7 | 9 |
| Example 5 | 2.8 | 26.5 | 3.1 | 0.31 | 97 | 1400 | 1173 | 84 | 6 | 1.8 | 6 |
| Example 6 | 9.1 | 26.6 | 3.3 | 0.24 | 98 | 912 | 783 | 86 | 8 | 2.9 | 7 |
| Example 7 | 4.2 | 27.1 | 3.4 | 0.51 | 91 | 754 | 641 | 85 | 14 | 4.5 | 8 |
| Example 8 | 5.2 | 29.9 | 3.9 | 0.25 | 90 | 987 | 793 | 80 | 17 | 4.9 | 10 |
| Example 9 | 3.7 | 23.2 | 2.8 | 0.35 | 113 | 873 | 621 | 71 | 5 | 1.3 | 6 |
| Comparative Example 1 | 2.8 | 26.8 | 2.9 | 0.25 | 69 | 512 | 220 | 43 | No shell layer observed | | |
| Comparative Example 2 | 10.4 | 27.9 | 4.1 | 0.29 | 86 | 420 | 231 | 55 | No shell layer observed | | |
| Comparative Example 3 | 3.3 | 32.2 | 5.2 | 0.33 | 50 | 950 | 651 | 69 | 32 | 5.3 | 16 |
| Comparative Example 4 | 4.6 | 21.9 | 2.3 | 0.18 | 43 | 283 | 201 | 71 | No shell layer observed | | |
| Comparative Example 5 | 4.8 | 27.5 | 1.7 | 0.28 | 39 | 109 | 58 | 53 | 9 | 3.1 | BG |
| Comparative Example 6 | 3.1 | 26.6 | 5.3 | 0.25 | 48 | 227 | 141 | 62 | 8 | 3.7 | 14 |
| Comparative Example 7 | 8.1 | 28.4 | 3.2 | 0.35 | 77 | 491 | 230 | 47 | Significant variations | | — |
| Comparative Example 8 | 7.3 | 21.7 | 2.3 | 0.23 | 53 | 173 | 62 | 36 | No shell layer observed | | |
| Comparative Example 9 | 9.2 | 21.5 | 1.9 | 0.19 | 48 | 93 | 40 | 43 | No shell layer observed | | |
| Comparative Example 10 | 2.3 | 0.0 | 0.0 | 0.00 | 143 | 844 | 407 | 48 | | | |

Note 1:
"BG" means the background level.

The magnetic powder of Comparative Example 8 had a samarium content of 21.7% by mass (lower than 22% by mass) and a nitrogen (N) content of 2.3% by mass (lower than 2.5% by mass). This is because calcium metal was used in an amount 1.0 time (less than 1.1 times) the equivalent. The magnetic powder of Comparative Example 8 had a remanent magnetization as low as 53 Am$^2$/kg and a coercive force as low as 173 kA/m. The magnetic powder of Comparative Example 8 was found to have no shell layer. The magnetic powder of Comparative Example 8 had a rate of coercive force retention of 36% (much lower than 70%) and had low heat resistance. The magnetic powder of Comparative Example 9 had a samarium content of 21.5% by mass (lower than 22% by mass) and a nitrogen (N) content of 1.9% by mass (lower than 2.5% by mass). This is because calcium metal was used in an amount 10.9 times (more than 10 times) the equivalent. The excessive amount of calcium would have caused inhibition of samarium diffusion. The magnetic powder of Comparative Example 9 had a remanent magnetization as low as 48 Am$^2$/kg and a coercive force as low as 93 kA/m. The magnetic powder of Comparative Example 9 was found to have no shell layer. The magnetic powder of Comparative Example 9 had a rate of coercive force retention of 43% (lower than 70%) and had low heat resistance.

The invention claimed is:

1. A rare earth-iron-nitrogen-based magnetic powder comprising a rare earth element (R), iron (Fe), and nitrogen (N) as main constituents,
    the magnetic powder having an average particle size of 1.0 μm or more and 10.0 μm or less and having a rare earth element (R) content of 22.0% by mass or more and 30.0% by mass or less and a nitrogen (N) content of 2.5% by mass or more and 4.0% by mass or less,
    the magnetic powder comprising magnetic particles comprising: a core having a crystal structure selected from the group consisting of Th$_2$Zn$_{17}$-type, Th$_2$Ni$_{17}$-type, and TbCu$_7$-type crystal structures; and a shell layer having a thickness of 1 nm or more and 30 nm or less and provided on a surface of the core,
    the shell layer containing a rare earth element (R) and iron (Fe) in an atomic ratio R/Fe of 0.3 or more and 5.0 or less and having a nitrogen (N) content of more than 0 at % and 10 at % or less,
    the magnetic powder further comprising particles of a compound comprising a rare earth element (R) and phosphorus (P).

2. The magnetic powder according to claim 1, wherein the shell layer has a two-layer structure comprising an outer layer and an inner layer,
    the outer layer comprises oxygen (O) and calcium (Ca) in addition to the rare earth element (R), iron (Fe), and nitrogen (N), and the inner layer comprises oxygen (O) in addition to the rare earth element (R), iron (Fe), and nitrogen (N) and is free of calcium (Ca).

3. The magnetic powder according to claim 2, wherein the shell layer has a two-layer structure comprising an outer layer and an inner layer, and
the outer layer has an atomic ratio R/Fe of A, the inner layer has an atomic ratio R/Fe of B, and B<A is satisfied.

4. The magnetic powder according to claim 1, comprising samarium (Sm) as the rare earth element (R).

5. The magnetic powder according to claim 1, further comprising a phosphoric acid-derived compound coating on uppermost surfaces of the magnetic particles.

6. The magnetic powder according to claim 1, having a rate of coercive force retention of 70% or more that is calculated as the percentage ratio ($H_{c,300}/H_c$) of the coercive force ($H_{c,300}$) of the magnetic powder measured after the magnetic powder is heated at 300° C. for 1 hour in an argon (Ar) atmosphere to the coercive force ($H_c$) of the magnetic powder measured before the heating.

7. A compound for forming a bonded magnet, the compound comprising: the magnetic powder according to claim 1; and a resin binder.

8. A bonded magnet comprising: the magnetic powder according to claim 1; and a resin binder.

9. A method for producing the rare earth-iron-nitrogen-based magnetic powder according to claim 1, the method comprising:
a preparation step that comprises preparing rare earth oxide particles and rare earth-iron alloy particles having a crystal structure selected from the group consisting of $Th_2Zn_{17}$-type, $Th_2Ni_{17}$-type, and $TbCu_7$-type crystal structures;
a mixing step that comprises mixing 100 parts by mass of the rare earth-iron alloy particles with 1 to 20 parts by mass of the rare earth oxide particles so as to form a raw material mixture comprising rare earth-iron alloy particles with a particle size of 15.0 μm or less and rare earth oxide particles with a particle size of 2.0 μm or less;
a reduction-diffusion treatment step that comprises adding to, and mixing with the raw material mixture, a reducing agent in an amount 1.1 to 10.0 times an equivalent of the reducing agent required to reduce an oxygen component in the raw material mixture and comprises heating the mixture of the reducing agent and the raw material mixture at a temperature in a range of 730° C. to 1,050° C. in a non-oxidizing atmosphere to produce a reduction-diffusion reaction product; and
a heating and nitriding step that comprises heating and nitriding the reduction-diffusion reaction product at a temperature in a range of 300° C. to 500° C. in a gas stream comprising nitrogen and/or ammonia to form a nitridation reaction product, wherein
one or both of the preparation step and the mixing step comprise forming a phosphoric acid-derived compound coating on the rare earth-iron alloy particles.

10. The method according to claim 9, wherein the mixing step comprises mixing and crushing the rare earth-iron alloy particles and the rare earth oxide particles in a crushing solvent containing a phosphoric acid-based surface treatment agent to form a phosphoric acid-derived compound coating on the rare earth-iron alloy particles.

11. The method according to claim 9, further comprising the step of subjecting the reduction-diffusion reaction product to disintegration treatment before the heating and nitriding.

12. The method according to claim 9, further comprising a wet treatment step that comprises placing the reduction-diffusion reaction product and/or the nitridation reaction product in a washing liquid comprising water and/or a glycol to allow the reduction-diffusion reaction product and/or the nitridation reaction product to disintegrate and thus to reduce the content of a reducing agent-derived component in the reduction-diffusion reaction product and/or the nitridation reaction product.

13. The method according to claim 9, further comprising the step of forming a phosphoric acid-derived compound coating on a surface of a product resulting from the heating and nitriding.

14. The method according to claim 9, wherein the raw material mixture has a weight loss on heating of less than 1% by mass.

15. The method according to claim 9, wherein heating the mixture of the reducing agent and the raw material mixture is performed for 0 to 10 hours to produce the reduction-diffusion reaction product.

16. The magnetic powder according to claim 2, comprising samarium (Sm) as the rare earth element (R).

17. The magnetic powder according to claim 2, further comprising a phosphoric acid-derived compound coating on uppermost surfaces of the magnetic particles.

18. The magnetic powder according to claim 2, having a rate of coercive force retention of 70% or more that is calculated as the percentage ratio ($H_{c,300}/H_c$) of the coercive force ($H_{c,300}$) of the magnetic powder measured after the magnetic powder is heated at 300° C. for 1 hour in an argon (Ar) atmosphere to the coercive force ($H_c$) of the magnetic powder measured before the heating.

19. A compound for forming a bonded magnet, the compound comprising: the magnetic powder according to claim 2; and a resin binder.

20. A bonded magnet comprising: the magnetic powder according to claim 2; and a resin binder.

* * * * *